(12) United States Patent
Yamamoto

(10) Patent No.: US 12,151,634 B2
(45) Date of Patent: Nov. 26, 2024

(54) CLIP AND VEHICLE CURTAIN AIRBAG DEVICE

(71) Applicant: Toyota Jidosha Kabushiki Kaisha, Toyota (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 699 days.

(21) Appl. No.: 17/223,348

(22) Filed: Apr. 6, 2021

(65) Prior Publication Data

US 2021/0394696 A1    Dec. 23, 2021

(30) Foreign Application Priority Data

Jun. 23, 2020 (JP) ................................ 2020-108273

(51) Int. Cl.
*B60R 21/20* (2011.01)
*B60R 21/232* (2011.01)
*F16B 19/10* (2006.01)
*F16B 21/06* (2006.01)

(52) U.S. Cl.
CPC ............ *B60R 21/20* (2013.01); *B60R 21/232* (2013.01); *F16B 19/1081* (2013.01); *F16B 21/065* (2013.01)

(58) Field of Classification Search
CPC ... B60R 21/20; B60R 21/232; F16B 19/1081; F16B 21/065; F16B 21/084; F16B 21/086; F16B 5/065; F16B 19/109; Y10S 411/913

USPC ............................................. 411/45, 508–510
See application file for complete search history.

(56) References Cited

U.S. PATENT DOCUMENTS

| 4,422,222 A * | 12/1983 | Notoya | F16B 21/082 |
| | | | 24/453 |
| 5,533,237 A * | 7/1996 | Higgins | F16B 21/075 |
| | | | 24/297 |
| 5,845,883 A * | 12/1998 | Meyer | F16L 3/127 |
| | | | 248/222.12 |
| 6,575,681 B2 * | 6/2003 | Kojima | F16B 21/086 |
| | | | 24/297 |

(Continued)

FOREIGN PATENT DOCUMENTS

| DE | 102013205465 A1 * | 10/2013 | ........... B60R 21/213 |
| JP | 2012102788 A * | 5/2012 | ........... F16B 21/086 |

(Continued)

*Primary Examiner* — William D Hutton, Jr.
*Assistant Examiner* — Dil K. Magar
(74) *Attorney, Agent, or Firm* — Dinsmore & Shohl LLP

(57) ABSTRACT

In a clip, a lock pin has a pair of locking portions and a pair of pinching portions. The locking portions are arranged so as to face each other in an opposing direction orthogonal to an insertion direction to the lock pin hole, each engage with the clip body to lock the lock pin to the clip body, and elastically deform toward a side that brings the locking portions close to each other to release engagement. The pinching portions extend toward an opening side of the lock pin hole and toward the side that brings the locking portions close to each other, are arranged so as to be offset from each other in an offset direction orthogonal to the insertion direction and the opposing direction, and are pinched by a tool from outside in the opposing direction so as to become close to each other together with the locking portions.

13 Claims, 18 Drawing Sheets

(56) References Cited

U.S. PATENT DOCUMENTS

| | | | | |
|---|---|---|---|---|
| 6,665,914 B2* | 12/2003 | Ogawa | ................ | F16B 21/075 |
| | | | | 24/297 |
| 8,220,827 B2* | 7/2012 | Schirm | ................ | B60R 21/216 |
| | | | | 280/730.2 |
| 8,286,924 B2* | 10/2012 | Sano | .................... | F16B 21/086 |
| | | | | 24/297 |
| 8,601,647 B2* | 12/2013 | Hasegawa | ............. | F16B 21/086 |
| | | | | 24/297 |
| 9,115,743 B2* | 8/2015 | Yamamoto | .......... | F16B 19/1081 |
| 2004/0155162 A1* | 8/2004 | Schneider | ............. | F16B 19/02 |
| | | | | 248/220.21 |
| 2008/0031701 A1* | 2/2008 | Boubtane | ............ | F16B 19/1081 |
| | | | | 411/80.1 |
| 2013/0257025 A1* | 10/2013 | Yamamoto | ............ | B60R 21/217 |
| | | | | 411/356 |
| 2015/0132078 A1* | 5/2015 | Yamamoto | .............. | F16B 21/12 |
| | | | | 411/22 |
| 2016/0121836 A1* | 5/2016 | Yamamoto | ............ | B60R 21/232 |
| | | | | 24/581.1 |
| 2016/0280172 A1* | 9/2016 | Yamamoto | ............ | F16B 5/0642 |

FOREIGN PATENT DOCUMENTS

| | | | | |
|---|---|---|---|---|
| JP | 2014020409 A * | 2/2014 | ............ | B60R 21/213 |
| JP | 5648756 B2 * | 1/2015 | ............. | B60R 21/20 |
| JP | 5668716 B2 * | 2/2015 | ............. | B60R 21/213 |
| JP | 5776644 B2 * | 9/2015 | ............. | F16B 19/10 |
| WO | WO-2012132544 A1 * | 10/2012 | ........ | B60R 16/0215 |
| WO | WO-2014020655 A1 * | 2/2014 | ............ | B60R 21/20 |

* cited by examiner

CLIP AND VEHICLE CURTAIN AIRBAG DEVICE

CROSS-REFERENCE TO RELATED APPLICATION

This application claims priority to Japanese Patent Application No. 2020-108273 filed on Jun. 23, 2020, incorporated herein by reference in its entirety.

BACKGROUND

1. Technical Field

The present disclosure relates to a clip in which a lock pin is inserted and disposed in a lock pin hole of a clip body, and a vehicle curtain airbag device provided with the clip.

2. Description of Related Art

Japanese Patent No. 5776644 (JP 5776644 B) discloses a fixture (clip) for fixing a curtain airbag to a vehicle body. This clip is composed of a clip body having a lock pin hole and a lock pin inserted and disposed in the lock pin hole. The clip body is inserted in a hole provided in the tab of the curtain airbag and is also inserted in a fixture mounting hole provided in the vehicle body. The lock pin is pushed in to the deeper side of the lock pin hole to restrict removal of the clip body from the fixing hole. The lock pin has a pair of locking portions that engage with the clip body to lock the lock pin to the clip body, and a pair of extensions (pinching portions) extending from the locking portions toward the opening side of the lock pin hole.

When the curtain airbag is rearranged, the pinching portions are pinched with a tool such as needle-nose pliers. Thereby, the locking portions elastically deform in a direction that brings the locking portions close to each other, and the engagement of the locking portions with the clip body is released. In that state, the lock pin is pulled out from the clip body. As a result, the clip body can be removed from the fixture mounting hole, and the curtain airbag can be detached from the vehicle body.

SUMMARY

In the above related art, the size of the clip is limited because the space for disposing the clip in the vehicle is limited. Thus, there is a case where it is difficult to set a gap to be wide between the inner peripheral surface of the lock pin hole in the clip body and the pinching portions provided to the lock pin, namely, a gap for inserting a tool such as needle-nose pliers. In that case, the pinching portions cannot be pinched with general needle-nose pliers, and special needle-nose pliers with thinner tip portions are required.

In consideration of the above facts, it is an object of the present disclosure is to provide a clip in which a gap between the inner peripheral surface of a lock pin hole in a clip body and a pair of pinching portions provided on the lock pin can be easily set to be wide, and a vehicle curtain airbag device equipped with the clip.

A clip according to a first aspect of the present disclosure includes: a clip body that has a lock pin hole and that is inserted in a fixing hole provided in an object to be fixed; and a lock pin that is inserted and arranged in the lock pin hole to restrict removal of the clip body from the fixing hole. The lock pin includes: a pair of locking portions, the locking portions being arranged so as to face each other in an opposing direction that is orthogonal to an insertion direction to the lock pin hole, the locking portions each engaging with the clip body to lock the lock pin to the clip body, and the locking portions elastically deforming toward a side that brings the locking portions close to each other to release engagement; and a pair of pinching portions, the pinching portions extending toward an opening side of the lock pin hole and toward the side that brings the locking portions close to each other, the pinching portions being arranged so as to be offset from each other in an offset direction that is orthogonal to the insertion direction and the opposing direction, and the pinching portions being pinched by a tool from outside in the opposing direction so as to become close to each other together with the locking portions.

In the first aspect, the clip body is inserted in the fixing hole provided in the object to be fixed. This clip body has the lock pin hole. The lock pin is inserted and arranged in the lock pin hole. The lock pin restricts the removal of the clip body from the fixing hole. The lock pin has the locking portions and the pinching portions. The locking portions are arranged so as to face each other in the opposing direction that is orthogonal to the insertion direction to the lock pin hole. The locking portions each engage with the clip body to lock the lock pin to the clip body. When the locking portions elastically deform toward the side that brings the locking portions close to each other, the engagement is released.

The pinching portions extend from the locking portions toward the opening side of the lock pin hole and toward the side that brings the locking portions close to each other. The pinching portions are arranged so as to be offset from each other in the offset direction that is orthogonal to the insertion direction and the opposing direction. When the pinching portion are pinched by the tool such as needle-nose pliers from the outside in the opposing direction, the locking portions become close to each other together with the pinching portions. As a result, the engagement of the locking portions with the clip body is released, which enables the lock pin to be removed from the clip body.

The pinching portions are arranged so as to be offset from each other in the offset direction. Therefore, even when the pinching portions extend from the locking portions toward the opening side of the lock pin hole and toward the side that brings the locking portions close to each other, it is possible to secure a displacement stroke for pinching with the tool. In other words, the pinching portions in a state where they are not pinched by the tool can be arranged close to each other toward the side that brings the locking portions close to each other (i.e., toward the inside in the opposing direction). As a result, it becomes easy to set gaps between the pinching portions and the inner peripheral surface of the lock pin hole to be wide. This makes it possible to pinch the pinching portions with general needle-nose pliers.

In the clip according to a second aspect of the present disclosure, in the first aspect, when the pinching portions are pinched by the tool and are positioned close to each other, the pinching portions are each held by the tool.

According to the second aspect, when the pinching portions of the lock pin are pinched by the tool such as needle-nose pliers and are positioned close to each other, the pinching portions are each held by the tool. This makes it easier to firmly hold the lock pin with the tool when the lock pin is removed from the lock pin hole by pinching the pinching portions with the tool.

In the clip according to a third aspect of the present disclosure, in the first or second aspect, end portions of the pinching portions on outer sides in the offset direction are each provided with a wall portion integrally extending outward in the opposing direction.

In the third aspect, when the pinching portions of the lock pin are pinched by the tool such as needle-nose pliers, the wall portions integrally extending from the pinching portions interfere with the tool from the outside in the offset direction. As a result, it is possible to limit the position of the tool in the offset direction. Thus, it is possible to suppress a situation in which the pinching portions are pinched with one of the pinching portions being intensely pinched.

In the clip according to a fourth aspect of the present disclosure, in the third aspect, an end surface of the wall portion on an inner side in the offset direction inclines or curves further outward in the offset direction as extending outward in the opposing direction.

In the fourth aspect, the wall portion integrally extending from each of the pinching portions of the lock pin has the end surface on the inner side in the offset direction that inclines or curves as described above. With the end surfaces, the tool can be guided toward the center in the offset direction with respect to the pinching portions, that is, the tool can be centered. As a result, it becomes easy to properly pinch the pinching portions with the tool.

In the clip according to a fifth aspect of the present disclosure, in the third or fourth aspect, the wall portion is integrally connected to each of the locking portions.

In the fifth aspect, the wall portions integrally extending from the pinching portions of the lock pin are integrally connected to the locking portions of the lock pin. The pinching portions extend from the locking portions toward the opening side of the lock pin hole and toward the side that brings the locking portions close to each other, that is, inward of the locking portions in the opposing direction. The root portions of the pinching portions can be reinforced with the wall portions integrally connected to the locking portions as described above.

In the clip according to a sixth aspect of the present disclosure, in any one of the first to fifth aspect, end surfaces of the pinching portions on inner sides in the offset direction incline in the same direction with respect to the offset direction when viewed in the insertion direction.

In the sixth aspect, end surfaces of the pinching portions of the lock pin on the inner sides in the offset direction incline in the same direction with respect to the offset direction when viewed in the insertion direction. Thus, in the pinching portions, the dimension of the surfaces that come into contact with the tool, that is, the dimension of the surfaces on the outer sides in the opposing direction, can be increased. As a result, even when the pinching portions are pinched with the special needle-nose pliers with thinner tip portions, for example, the tip portions of the needle-nose pliers can be easily engaged with the pinching portions.

A vehicle curtain airbag device according to a seventh aspect of the present disclosure includes: a curtain airbag that is stored in an upper part of a vehicle cabin side portion, and that is inflated and expanded toward a lower side of a vehicle when gas is supplied into the curtain airbag; and the clip according to any one of the first to sixth aspects, in which the clip body is inserted in the fixing hole provided in a body panel that serves as an object to be fixed and that is provided in the upper part of the vehicle cabin side portion, the curtain airbag being locked to the body panel by the clip body.

In the seventh aspect, the curtain airbag that is stored in the upper part of the vehicle cabin side portion is inflated and expanded toward the lower side of the vehicle when gas is supplied into the curtain airbag. The body panel serving as the object to be fixed is provided in the upper part of the vehicle cabin side portion. The clip body of the clip is inserted in the fixing hole provided in the body panel. The curtain airbag is locked to the body panel by the clip body. The clip is the clip mentioned in any one of the first to sixth aspects. Therefore, the lock pin inserted and disposed in the lock pin hole of the clip body restricts the removal of the clip body from the fixing hole. In the seventh aspect, the same operations and effects as those in any one of the first to sixth aspects can be obtained.

As described above, in the clip and the vehicle curtain airbag device according to the present disclosure, it is easy to set gaps between the inner peripheral surface of the lock pin hole in the clip body and the pinching portions provided in the lock pin to be wide.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a clip 10 and a vehicle curtain airbag device 80 according to an embodiment of the present disclosure will be described with reference to FIGS. 1 to 14. In each drawing, some reference signs may be omitted in order to make the drawings easier to see. First, the overall configuration of the vehicle curtain airbag device 80 will be described, and then the configuration of the clip 10 will be described.

Overall Configuration of Curtain Airbag Device

Figure 13:
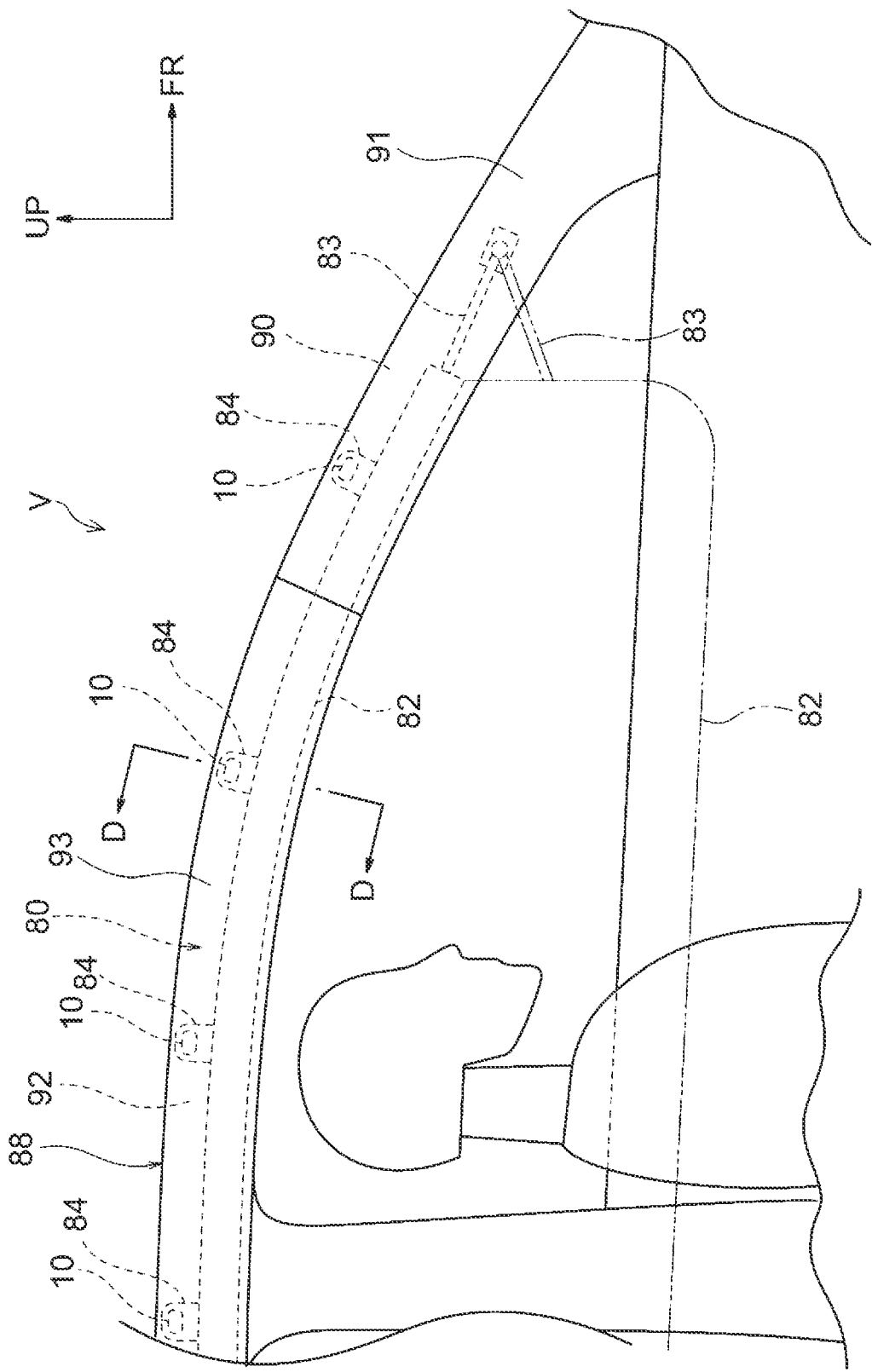
FIG. 13 is a side view showing a partial configuration of a vehicle curtain airbag device according to the embodiment of the present disclosure.

As shown in FIG. 13, the vehicle curtain airbag device 80 is mounted on a sedan-type vehicle V as an example, and includes a curtain airbag 82 and an inflator (not shown). Note that, an arrow UP in FIGS. 13 and 14 indicates a vehicle upper side, an arrow FR in FIG. 13 indicates a front side in a front-rear direction of a vehicle, and an arrow OUT in FIG. 14 indicates an outer side in a width direction of the vehicle.

Normally, the curtain airbag 82 is folded into a long shape as shown by a broken line in FIG. 13, and is stored together with an inflator in a roof side portion 88 provided at an upper end portion of a vehicle cabin side portion. In this stored state, the long curtain airbag 82 extends from the rear part of an A-pillar 90 to an upper end side of a C-pillar (not shown) along a roof side rail 92. In FIG. 13, reference sign 91 denotes an A-pillar garnish and reference sign 93 denotes a roof head lining.

Figure 14:
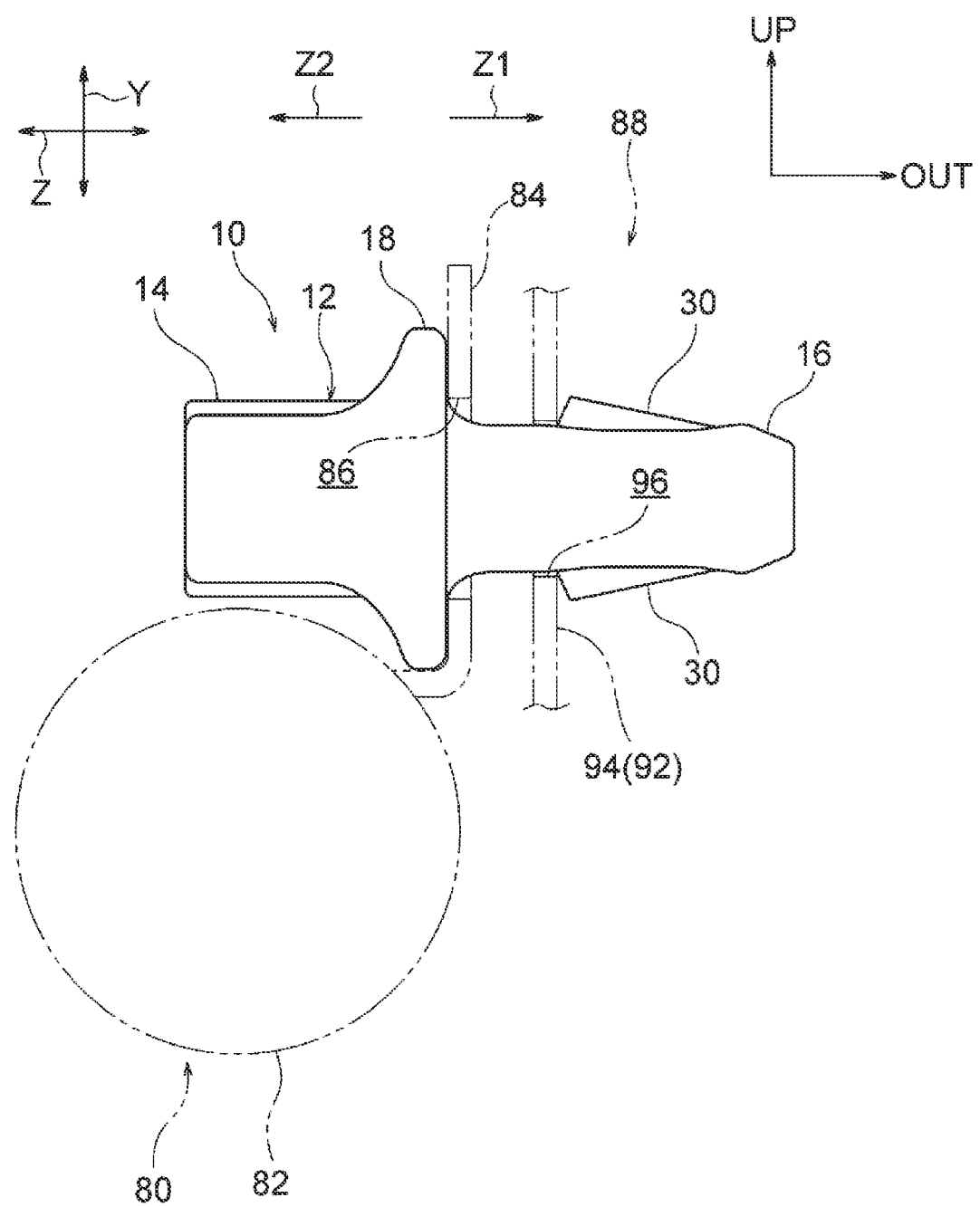
FIG. 14 is an enlarged cross-sectional view showing a section cut along line D-D of FIG. 13.
Figure 15:
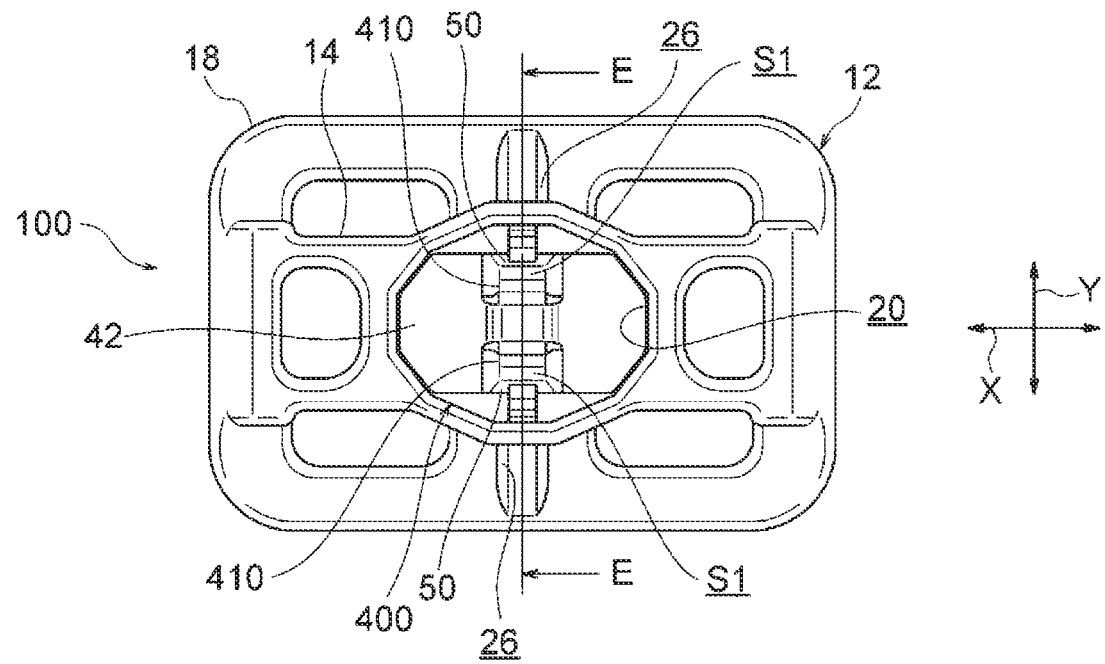
FIG. 15 is a plan view showing a clip according to a comparative example.
Figure 16:
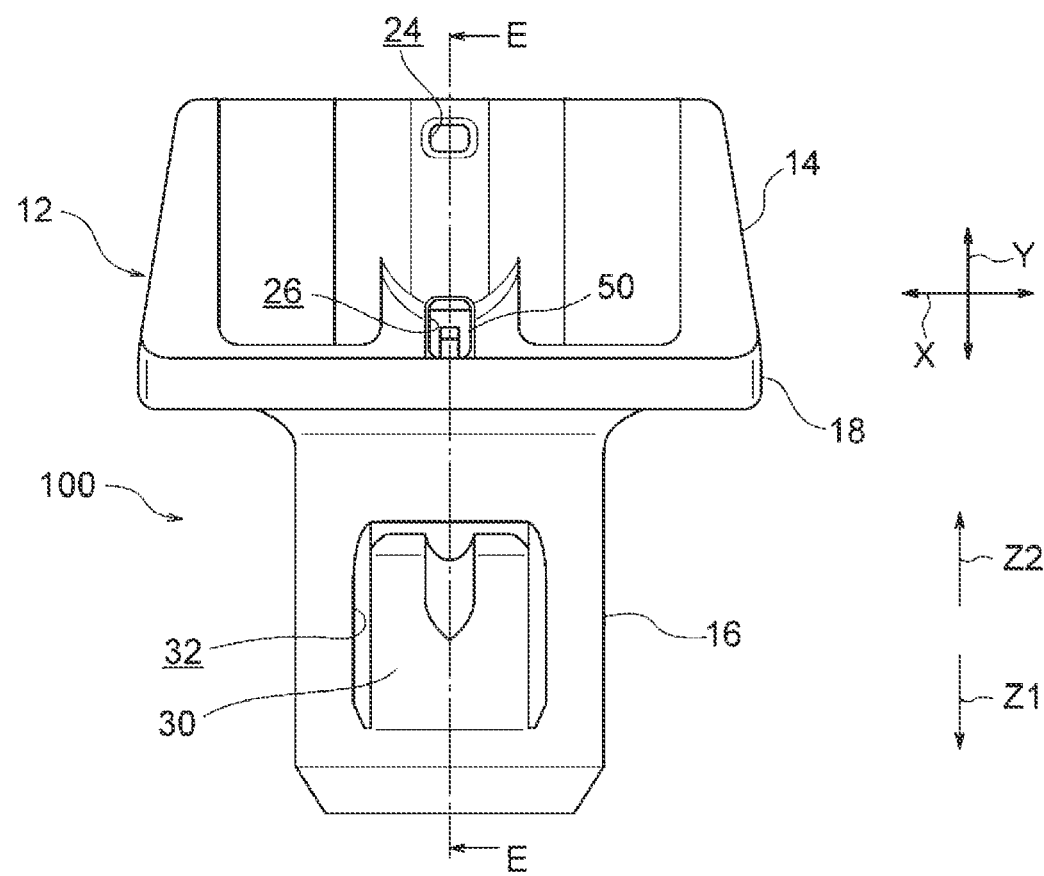
FIG. 16 is a side view showing the clip according to the comparative example.
Figure 17:
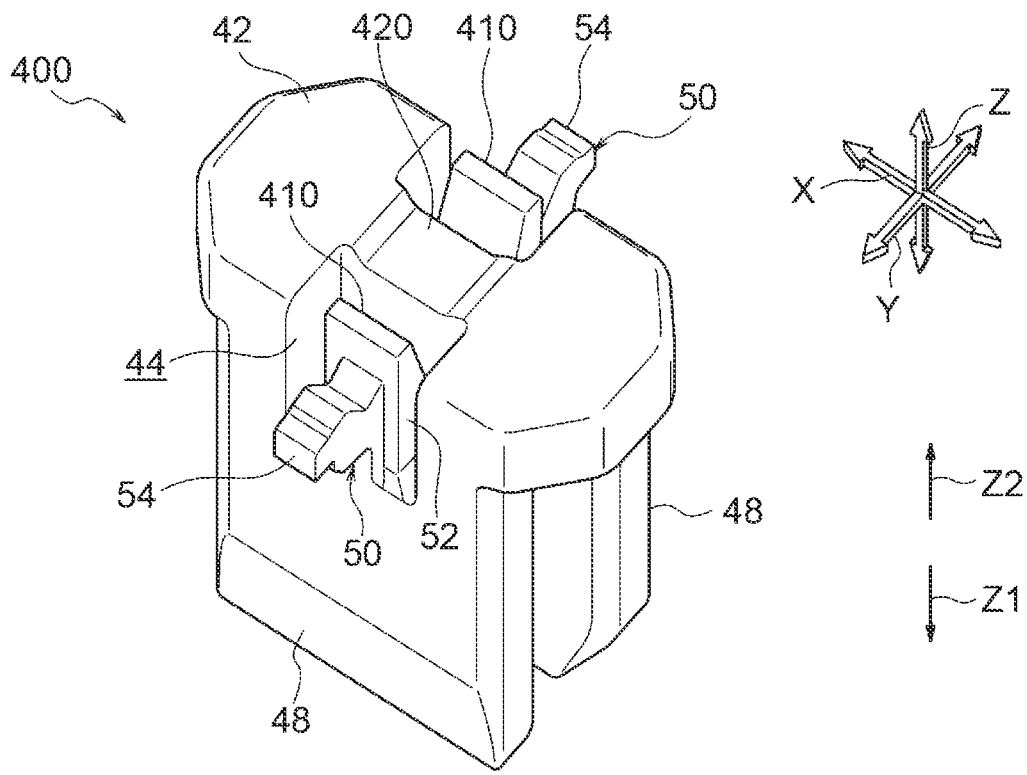
FIG. 17 is a perspective view of the lock pin included in the clip according to the comparative example, showing a state where locking portions are separated from each other and pinching portions are separated from each other.

The curtain airbag 82 has a bag shape and is made of, for example, a nylon-based or polyester-based cloth material. A plurality of tongue-shaped tabs 84 is arranged at the upper edge of the curtain airbag 82 side by side in the front-rear direction of the vehicle. The tabs 84 extend from the upper edge of the curtain airbag 82 toward the upper side of the vehicle. As shown in FIG. 14, each tab 84 is provided with a locking hole 86. A clip 10 according to the present embodiment is inserted in the locking hole 86 of each tab 84.

Each clip 10 is also inserted in a fixing hole 96 provided in a body panel 94 of the roof side portion 88. Thereby, the curtain airbag 82 is fixed to the body panel 94 with each clip 10. A tension belt 83 extends between the front end portion of the curtain airbag 82 and the A-pillar 90. The curtain airbag 82 is inflated and expanded toward the lower side of the vehicle along the vehicle cabin side portion as shown by a long dashed double-short dashed line in FIG. 13, with gas supply from the inflator to the inside of the curtain airbag 82.

Configuration of Clip

As shown in FIGS. 1 to 4, 8 to 12, and 14, the clip 10 includes a clip body 12 and a lock pin 40. The clip body 12 and the lock pin 40 are made of a flexible resin such as polyacetal or polyhexamethylene adipamide. In the following description, the directions indicated by the arrows X, Y, and Z appropriately shown in each drawing are referred to as an offset direction X, an opposing direction Y, and an insertion-removal direction Z, respectively. Further, in the following description, the directions indicated by the arrows Z1 and Z2 appropriately shown in each drawing are referred to as an insertion direction Z1 and a removal direction Z2, respectively. The offset direction X, the opposing direction Y, and the insertion-removal direction Z are orthogonal to each other. Further, the insertion direction Z1 is one direction of the insertion-removal direction Z, and the removal direction Z2 is the other direction of the insertion-removal direction.

Configuration of Clip Body

The clip body 12 has a long, substantially rectangular parallelepiped shape with the insertion-removal direction Z serving as its longitudinal direction. The clip body 12 integrally has a body head portion 14, a flange portion 18, and a body leg portion 16. The body head portion 14 is a portion of the clip body 12 on the removal direction Z2 side, and the body leg portion 16 is a portion of the clip body 12 on the insertion direction Z1 side. The body head portion 14 is set to have larger dimensions in the offset direction X and the opposing direction Y than the body leg portion 16. The flange portion 18 is provided between the body head portion 14 and the body leg portion 16. The flange portion 18 projects in a flange shape in the offset direction X and the opposing direction Y.

Figure 1:
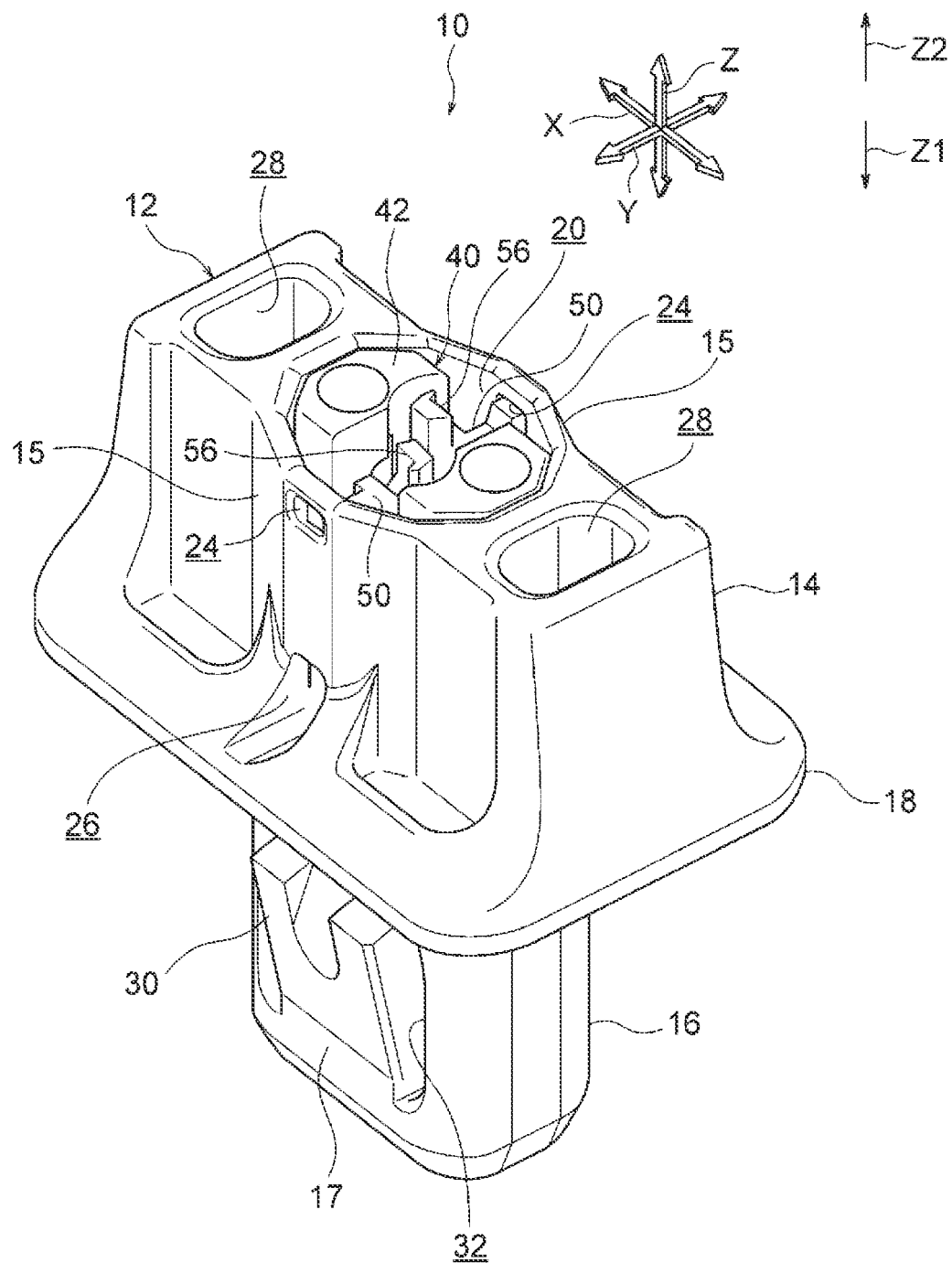
FIG. 1 is a perspective view of a clip according to an embodiment of the present disclosure, in which a lock pin is located at a temporary locking position with respect to a clip body.
Figure 2:
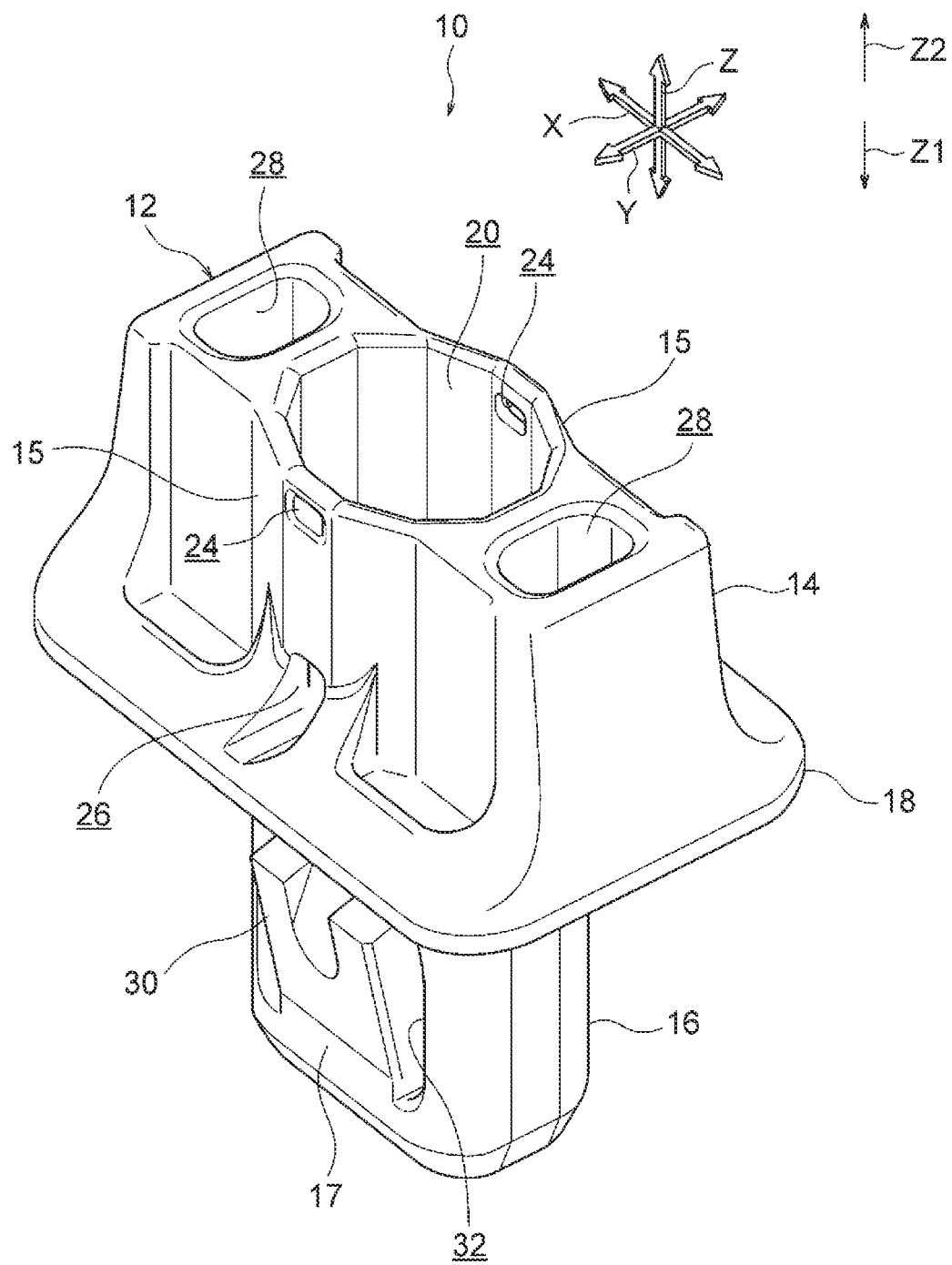
FIG. 2 is a perspective view corresponding to FIG. 1, showing a state where the lock pin is located at a main locking position with respect to the clip body.
Figure 3:
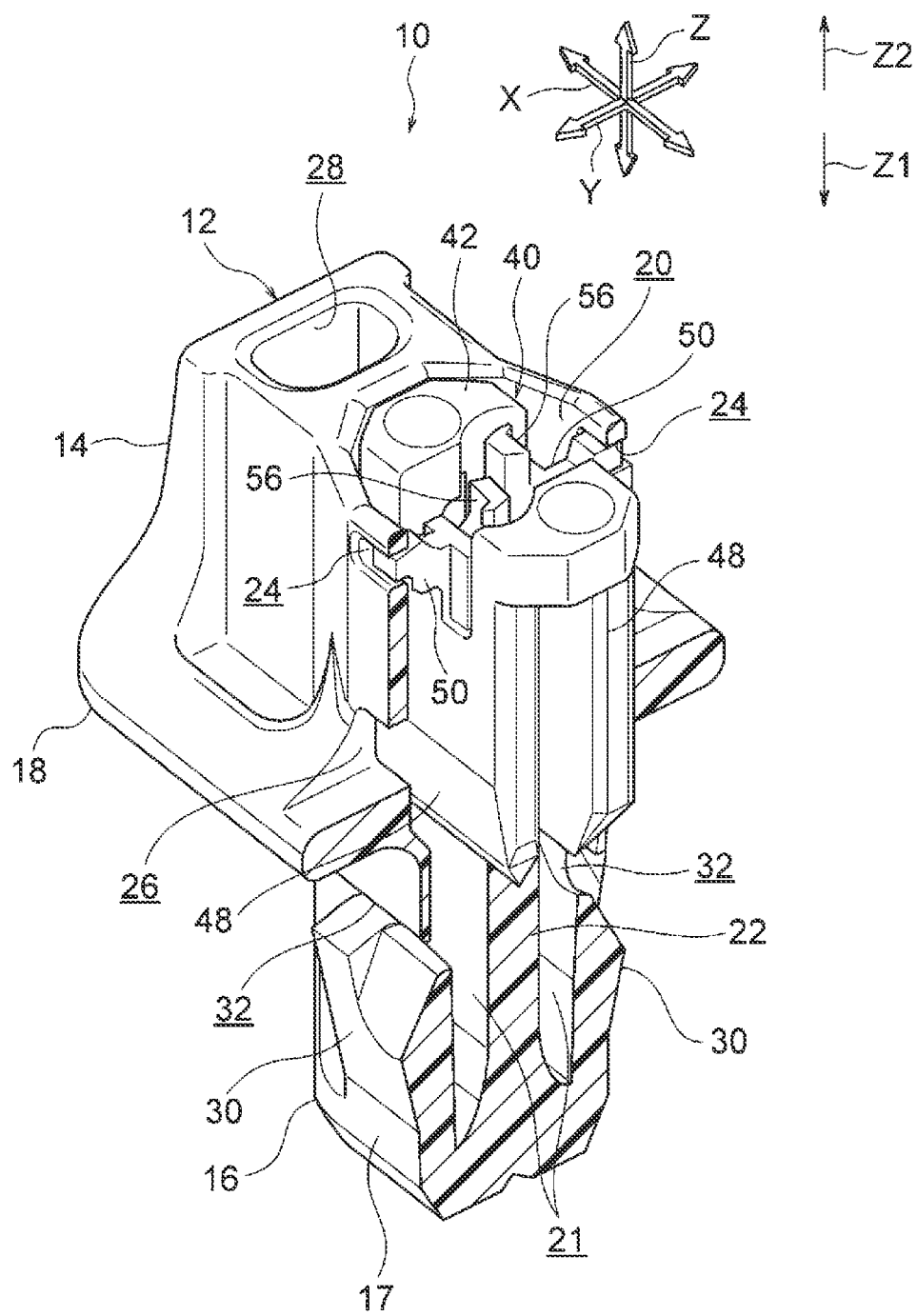
FIG. 3 is a perspective view corresponding to FIG. 1, showing a state where the clip body is cut in half.
Figure 4:
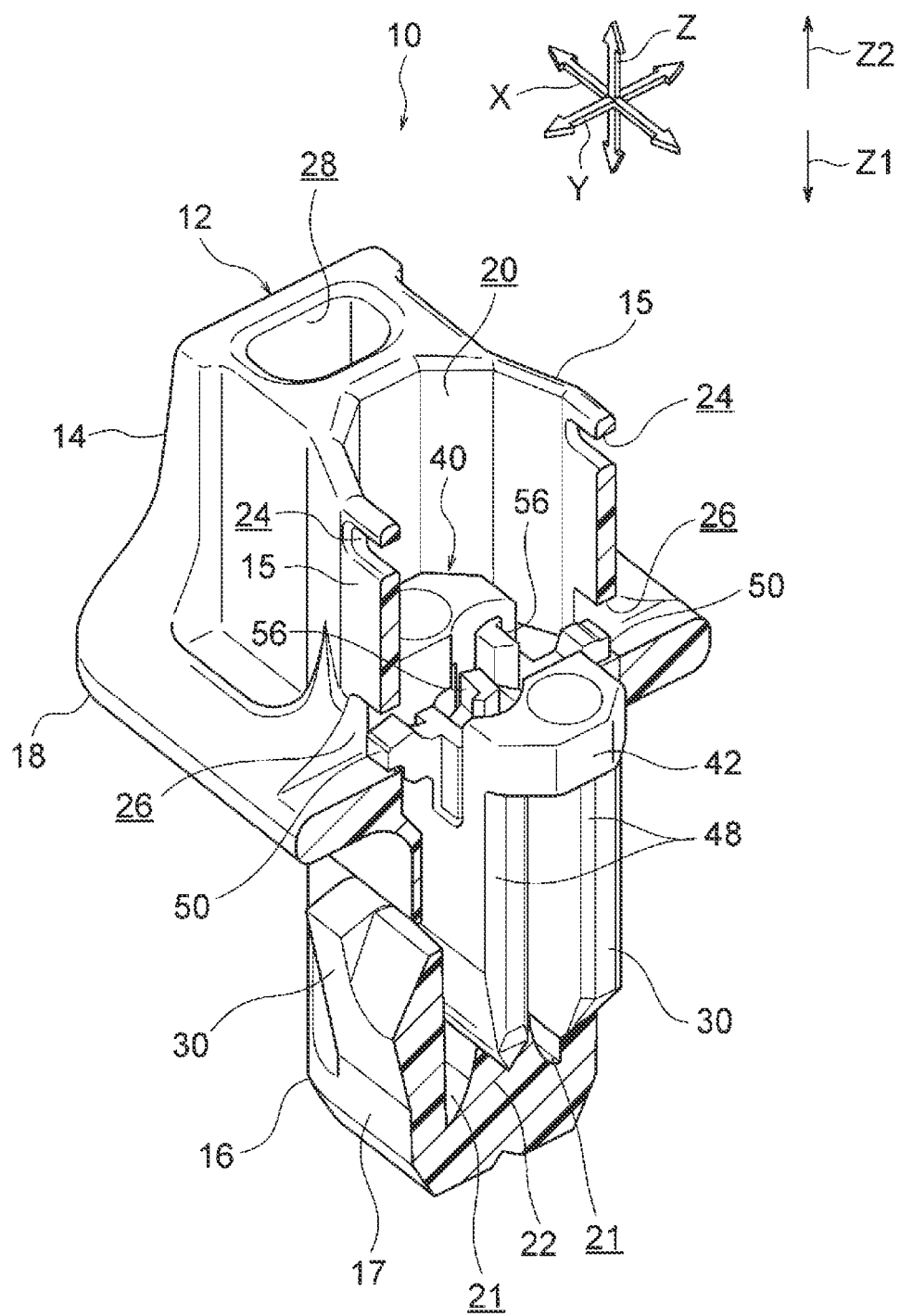
FIG. 4 is a perspective view corresponding to FIG. 2, showing a state where the clip body is cut in half.

As shown in FIGS. 3 and 4, the clip body 12 is provided with a bottomed lock pin hole 20. The lock pin hole 20 is open on the removal direction Z2 side, and is closed on the insertion direction Z1 side. The lock pin hole 20 extends in the insertion-removal direction Z from the body head portion 14 to the body leg portion 16. A backup rib 22 is provided in the lock pin hole 20. The backup rib 22 extends from a bottom wall of the lock pin hole 20 toward the removal direction Z2 side. A tip portion of the backup rib 22 is disposed at a position equivalent to that of the flange portion 18 in the insertion-removal direction Z. On the insertion direction Z1 side of the body head portion 14, the inside of the lock pin hole 20 is partitioned into a pair of pin leg insertion chambers 21 by the backup rib 22 described above. The pin leg insertion chambers 21 are arranged side by side in the opposing direction Y.

In the body head portion 14, temporary locking holes 24 and main locking holes 26 are provided in wall portions 15 on the opposite sides of the lock pin hole 20 in the opposing direction Y. The temporary locking hole 24 and the main locking hole 26 pass through each of the wall portions 15 in the opposing direction Y. The temporary locking hole 24 is provided at an end portion of the body head portion 14 on the removal direction Z2 side. The main locking hole 26 is provided at an end portion of the body head portion 14 on the insertion direction Z1 side. Further, in the body head portion 14, bottomed lightening holes 28 are provided on the opposite sides of the lock pin hole 20 in the offset direction X. The lightening holes 28 are open on the removal direction Z2 side, and are closed on the insertion direction Z1 side.

In the body leg portion 16, body locking lugs 30 are provided on wall portions 17 on the opposite sides of the lock pin hole 20 in the opposing direction Y. In the wall portion 17 of the body leg portion 16, a slit 32 having a generally inverted U-shape when viewed in the opposing direction Y is provided around each of the body locking lugs 30. Thereby, each of the body locking lugs 30 is separated from the wall portion 17 of the body leg portion 16 on both sides in the offset direction X and on the insertion direction Z1 side, and is connected to the wall portion 17 of the body leg portion 16 only on the insertion direction Z1 side. Each body locking lug 30 inclines further outward in the opposing direction Y as it extends toward the removal direction Z2 side.

In the present embodiment, the body leg portion 16 is provided with the pair of body locking lugs 30, but the present disclosure is not limited to this. For example, the body leg portion 16 may be provided with four body locking lugs 30. In this case, the body locking lugs 30 are provided on the opposite sides of the body leg portion 16 in the offset direction X and the opposite sides of the body leg portion 16 in the opposing direction Y.

As shown in FIG. 14, the body leg portion 16 of the clip body 12 is inserted in the locking hole 86 provided in the tab 84 of the curtain airbag 82, and is inserted in the fixing hole 96 provided in the body panel 94 from the inner side in the vehicle width direction (left side in FIG. 14). When the body leg portion 16 is inserted in the fixing hole 96, the body locking lugs 30 slide with respect to a hole edge portion of the fixing hole 96. Thereby, the body locking lugs 30 elastically deform toward a side that brings the body locking lugs 30 close to each other, that is, inward in the opposing direction Y. Then, when the body locking lugs 30 have passed through the fixing hole 96, the body locking lugs 30 elastically restores, and the body locking lugs 30 engage with the hole edge portion of the fixing hole 96 from the outer side in the vehicle width direction (from the right side in FIG. 14). As a result, the clip body 12 is held by the body panel 94.

In the above holding state, the tab 84 is disposed between the flange portion 18 of the clip body 12 and the body panel 94, so the tab 84 is restricted from falling off from the clip body 12 by the flange portion 18. A spacer (not shown) is disposed between the tab 84 and the body panel 94. The spacer has a generally wave washer shape and made of, for example, a flexible resin.

Configuration of Lock Pin

Figure 5:
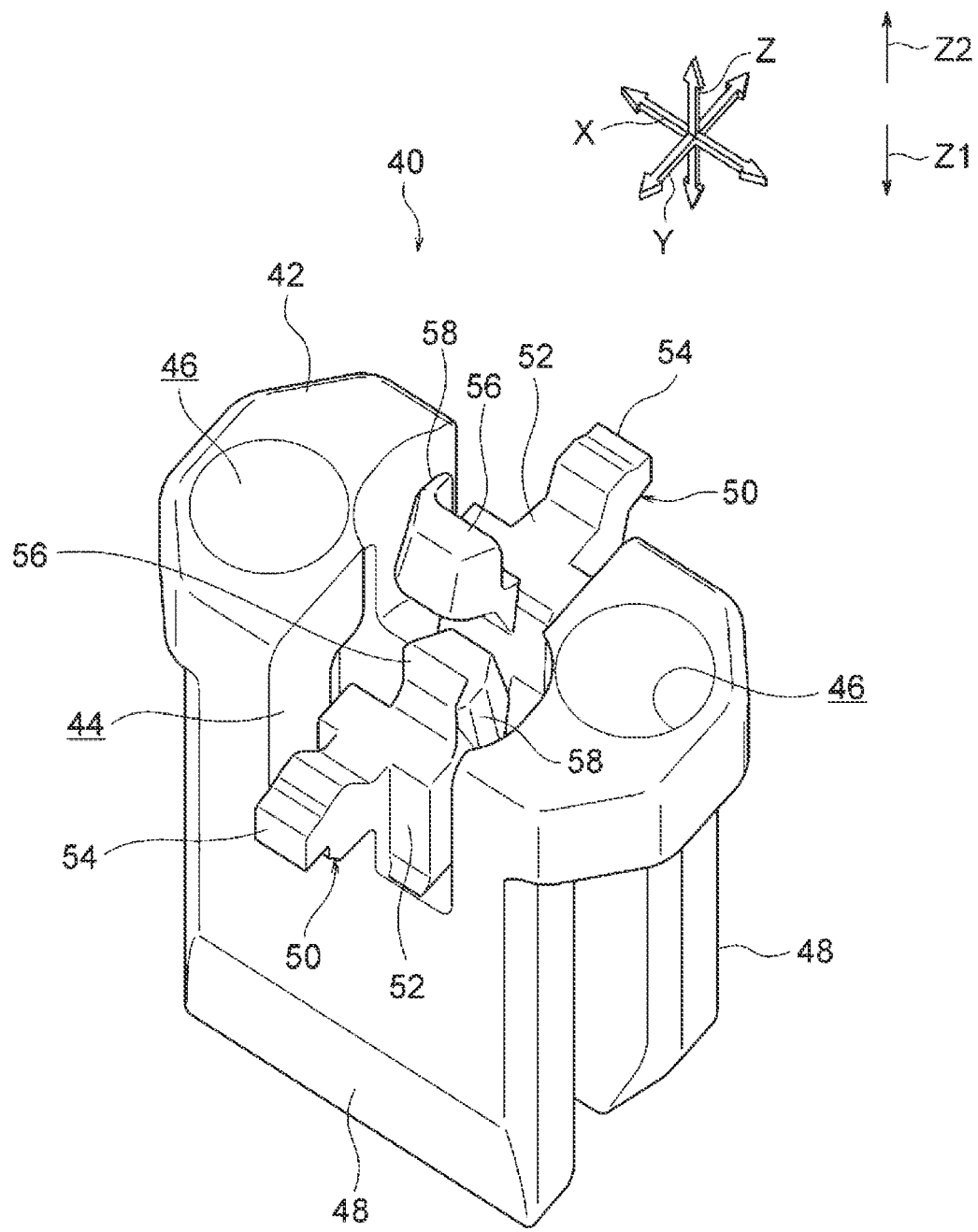
FIG. 5 is a perspective view of the lock pin, showing a state where locking portions are separated from each other and pinching portions are separated from each other.
Figure 6:
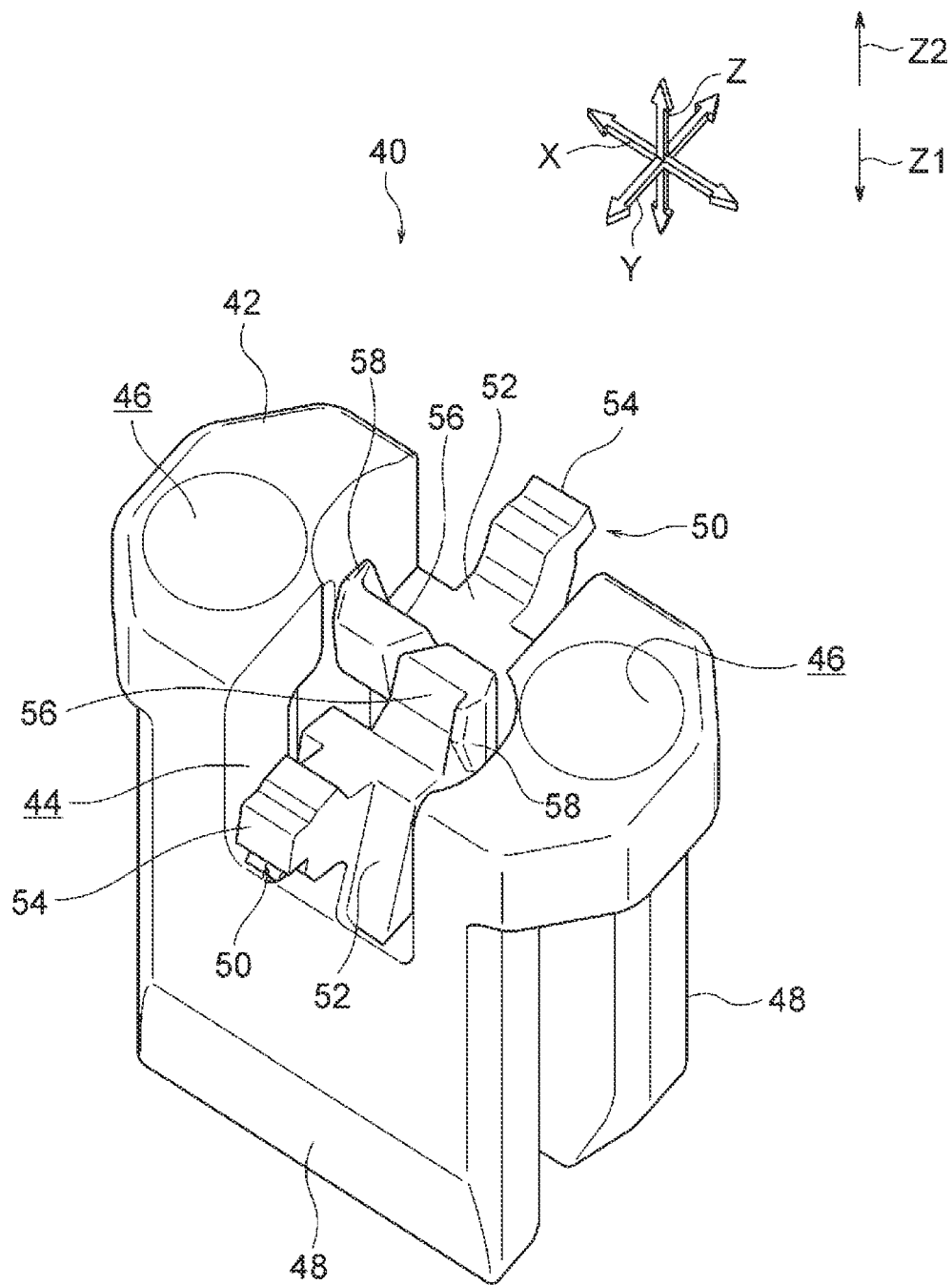
FIG. 6 is a perspective view corresponding to FIG. 5, showing a state where the locking portions are positioned close to each other and the pinching portions are positioned close to each other.
Figure 7:
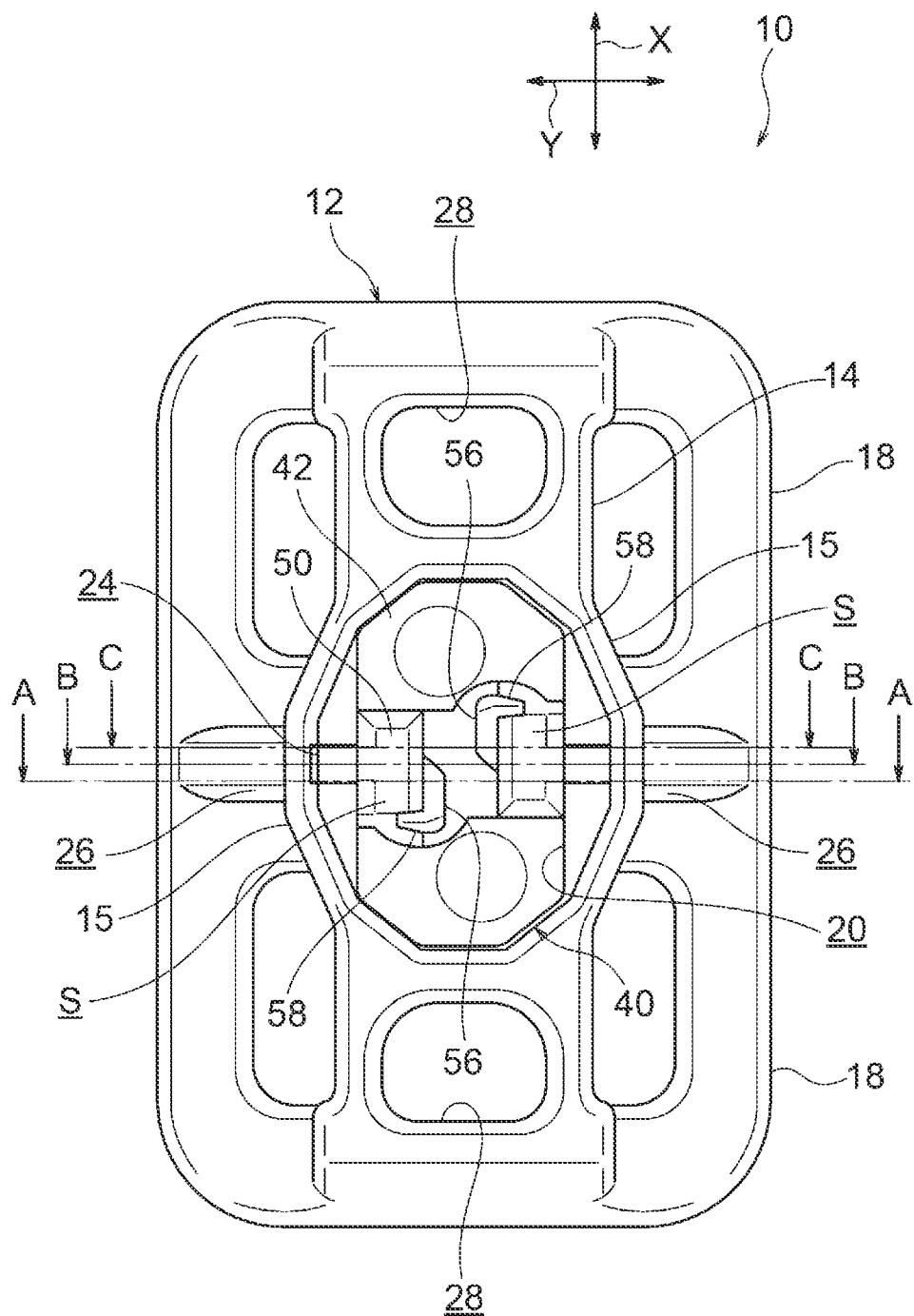
FIG. 7 is a plan view of the clip according to the embodiment of the present disclosure.
Figure 8:
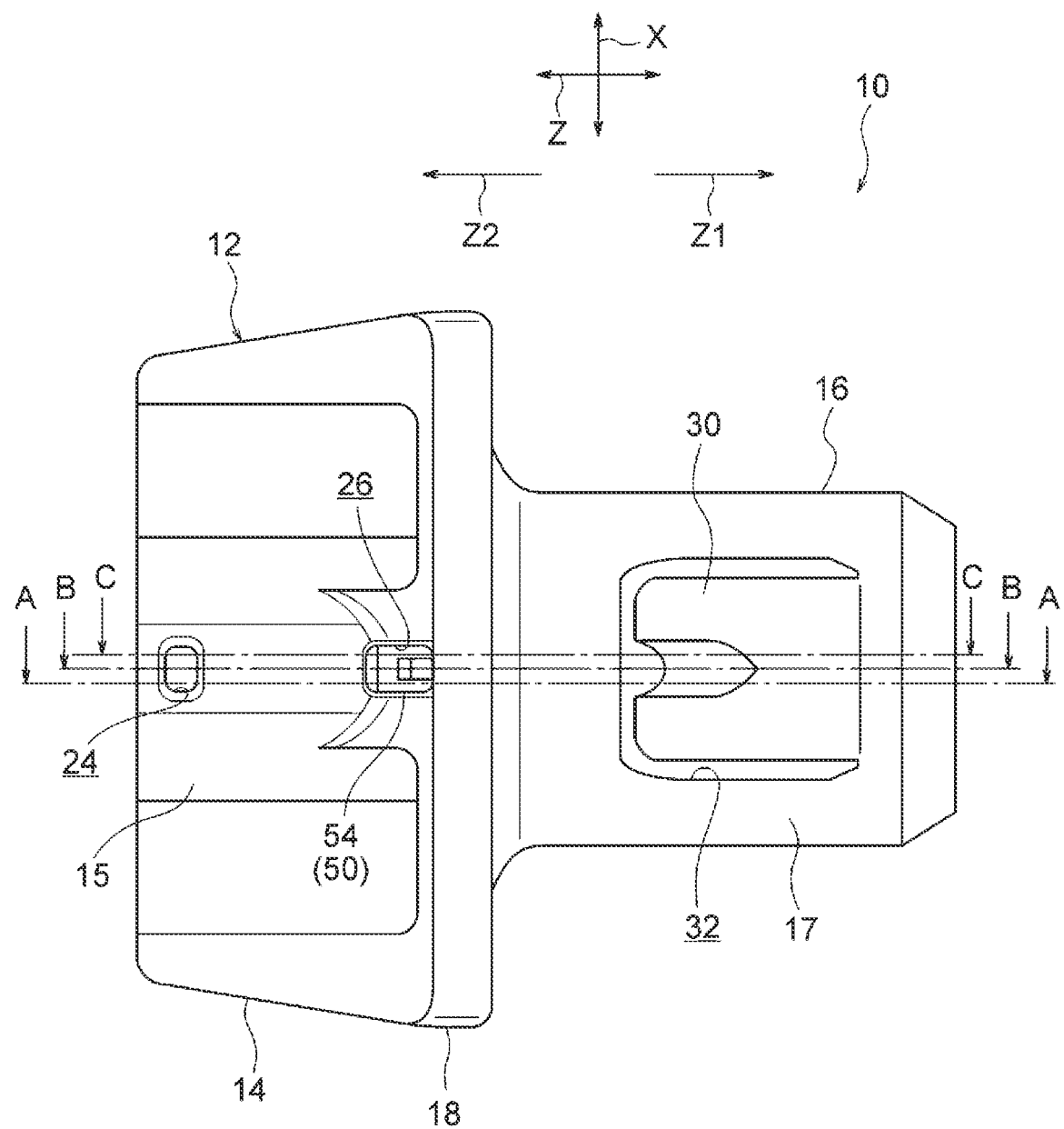
FIG. 8 is a side view of the clip according to the embodiment of the present disclosure.
Figure 9A:
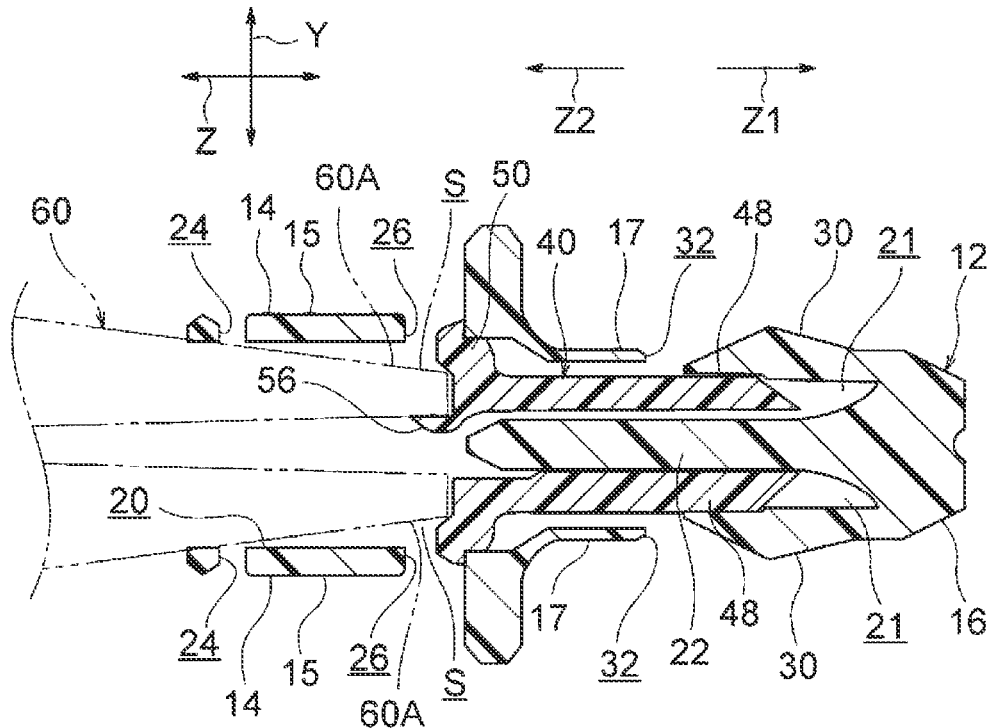
FIG. 9A is a sectional view showing a section cut along line A-A of FIGS. 7 and 8.
Figure 9B:
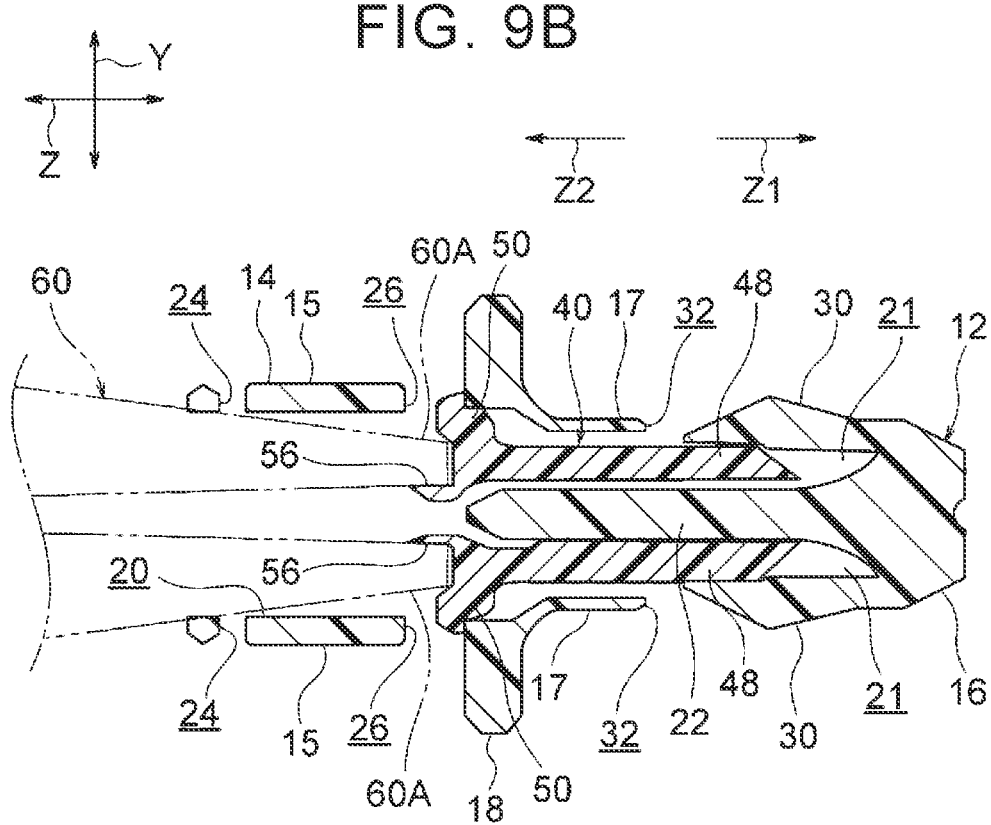
FIG. 9B is a sectional view showing a section cut along line B-B of FIGS. 7 and 8.
Figure 9C:
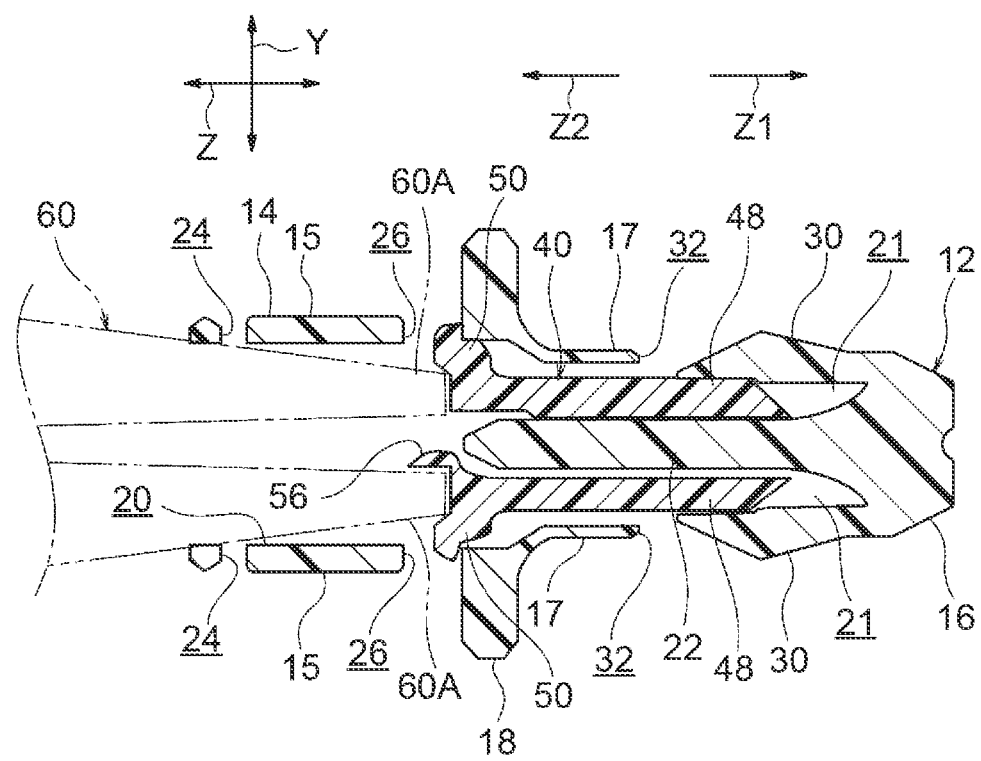
FIG. 9C is a sectional view showing a section cut along line C-C of FIGS. 7 and 8.

As shown in FIGS. 5 and 6, the lock pin 40 has a long, generally rectangular parallelepiped shape with the insertion-removal direction Z serving as its longitudinal direction, and is configured to be inserted and disposed in the lock pin hole 20. The lock pin 40 integrally includes a pin head portion 42, a pair of pin leg portions 48, a pair of locking portions 50, and a pair of pinching portions 56. The lock pin 40 is provided with a notch portion 44 cut out from the removal direction Z2 side. The notch portion 44 is provided at a central portion of the lock pin 40 in the offset direction X on the removal direction Z2 side.

The pin head portion 42 constitutes an end portion of the lock pin 40 on the removal direction Z2 side. The pin head portion 42 is divided into two in the offset direction X by the notch portion 44 described above. In the pin head portion 42, bottomed lightening holes 46 are provided on the opposite sides of the notch portion 44 in the offset direction X. The lightening holes 46 are open on the removal direction Z2 side, and are closed on the insertion direction Z1 side.

The pin leg portions 48 each have a plate shape with the opposing direction Y serving as its plate thickness direction, and are arranged so as to face each other in the opposing direction Y. The pin leg portions 48 integrally extend from the pin head portion 42 toward the insertion direction Z1 side. In the pin leg portions 48, the notch portion 44 reaches end portions of the pin leg portions 48 of the clip body 12 on the removal direction Z2 side. When four body locking lugs 30 are provided on the body leg portion 16, the lock pin 40 is provided with four pin leg portions 48.

The locking portions 50 each have a locking portion body 52 and a pin locking lug 54, and are arranged in a symmetrical shape in the opposing direction Y. The locking portion bodies 52 are arranged at the center in the notch portion 44 in the offset direction X, and face each other in the opposing direction Y. Each locking portion body 52 extends from an end surface of each pin leg portion 48 on the removal direction Z2 side toward the removal direction Z2 side, and has a plate shape with the opposing direction Y serving as its plate thickness direction. Each pin locking lug 54 extends outward in the opposing direction Y from a portion of each locking portion body 52 on the removal direction Z2 side. A portion of each pin locking lug 54 on the tip end side protrudes more toward the removal direction Z2 side than each locking portion body 52. Each pin locking lug 54 is set to have a smaller dimension than each locking portion body 52 in the offset direction X, and extends from a central portion of each locking portion body 52 in the offset direction X.

As shown in FIG. 3, in a state where the lock pin 40 is located the temporary locking position, the pin locking lugs 54 of the locking portions 50 fit into (engage with) the temporary locking holes 24 of the clip body 12. As a result, the lock pin 40 is held at the temporary locking position. In this state, the end surface of the clip body 12 on the removal direction Z2 side and the end surface of the lock pin 40 on the removal direction Z2 side are positioned on the same plane or substantially on the same plane, and the entire lock pin 40 is positioned in the lock pin hole 20. Thus, it is possible to restrain the lock pin 40 from being erroneously inserted to the deeper side in the lock pin hole 20.

Further, in this state, the pin leg portions 48 of the lock pin 40 are positioned more toward the removal direction Z2 side than the body locking lugs 30 of the clip body 12. In this state, the body locking lugs 30 can elastically deform toward the side that brings the body locking lugs 30 close to each other, that is, inward in the opposing direction Y, and the clip body 12 can be inserted and removed to and from the fixing hole 96 of the body panel 94. Therefore, an operation of fixing the tab 84 of the curtain airbag 82 to the body panel 94 with the clip body 12, that is, an operation of inserting the body leg portion 16 of the clip body 12 into the fixing hole 96 of the body panel 94 is performed with the lock pin 40 being located at the temporary locking position.

When the body leg portion 16 of the clip body 12 is inserted in the fixing hole 96, the lock pin 40 is pushed into the main locking position shown in FIG. 4. At the time of pushing, the locking portions 50 of the lock pin 40 elastically deform toward the side that brings the locking portions 50 close to each other, that is, inward in the opposing direction Y. Then, when the lock pin 40 reaches the main locking position shown in FIG. 14, the locking portions 50 elastically restore, and the pin locking lugs 54 of the locking portions 50 fit into (engage with) the main locking holes 26 of the clip body 12. As a result, the lock pin 40 is held at the main locking position. The above-mentioned main locking position is set to the deeper side of the lock pin hole 20 from the temporary locking position. Further, the pushing is performed using, for example, a dedicated tool.

As shown in FIG. 4, in the state where the lock pin 40 is located at the main locking position, the pin leg portions 48 of the lock pin 40 are inserted into the pin leg insertion chambers 21 of the lock pin hole 20. In this state, the pin leg portions 48 are arranged to face the body locking lugs 30 of the clip body 12 from the inside in the opposing direction Y. As a result, the body locking lugs 30 cannot elastically deform toward the side that brings the body locking lugs 30 close to each other, that is, inward in the opposing direction Y, and the removal of the clip body 12 from the fixing hole 96 of the body panel 94 is restricted.

Main Components of Embodiment

The lock pin 40 having the above configuration has the pinching portions 56 as described above. The pinching portions 56 are protrusions for elastically deforming the locking portions 50 of the lock pin 40 toward the side that brings the locking portions 50 close to each other to release the fit of the pin locking lugs 54 to the main locking holes 26 of the clip body 12. The wording "release the fit" can be regarded as a wording "release the engagement" in the present disclosure. The pinching portions 56 extend from the locking portion bodies 52 of the locking portions 50 toward the opening side of the lock pin hole 20 (i.e., removal direction Z2 side) and toward the side that brings the locking portions 50 close to each other (i.e., inward in the opposing direction Y). That is, each pinching portion 56 projects toward the removal direction Z2 side and inward in the opposing direction Y with respect to the locking portion body 52. The end surface of each pinching portion 56 on the removal direction Z2 side is positioned on the same plane or substantially on the same plane as the end surface of the pin head portion on the removal direction Z2 side.

Further, the pinching portions 56 are arranged so as to be offset from each other in the offset direction X that is orthogonal to the insertion-removal direction Z and the opposing direction Y. Specifically, the pinching portions 56 are arranged so as to slightly overlap each other when viewed in the opposing direction Y. Further, the pinching portions 56 each have a generally trapezoidal shape when viewed in the insertion-removal direction Z, and are arranged so that the long side of each pinching portion 56 face outward in the opposing direction Y. End surfaces 56B (see FIG. 12) of the pinching portions 56 on the inner side in the offset direction X incline in the same direction with respect to the offset direction X when viewed in the insertion direction Z1.

Figure 10:
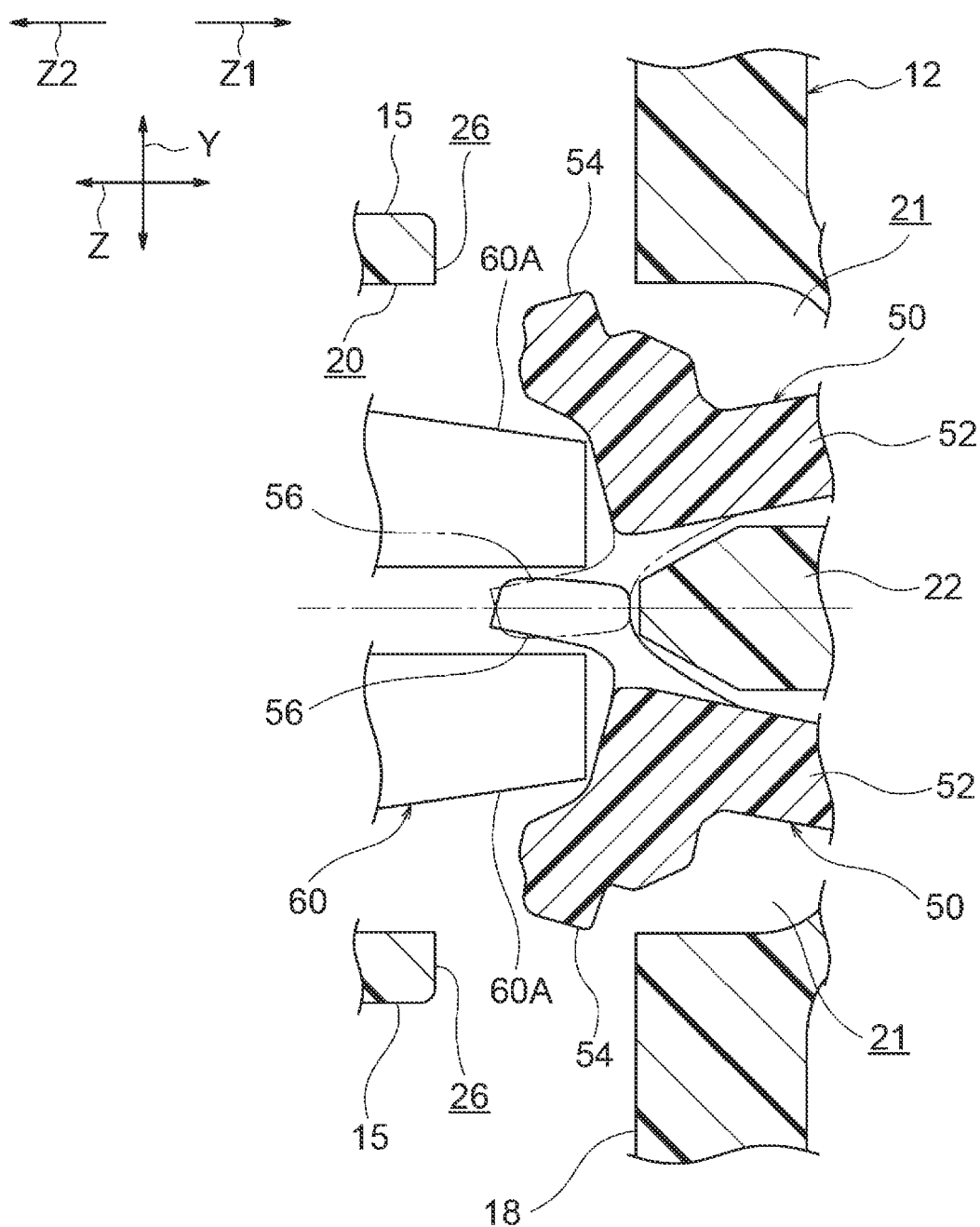
FIG. 10 is a sectional view corresponding to a part of FIG. 9B, and is an enlarged view showing a state where the pinching portions are pinched by needle-nose pliers.
Figure 11:
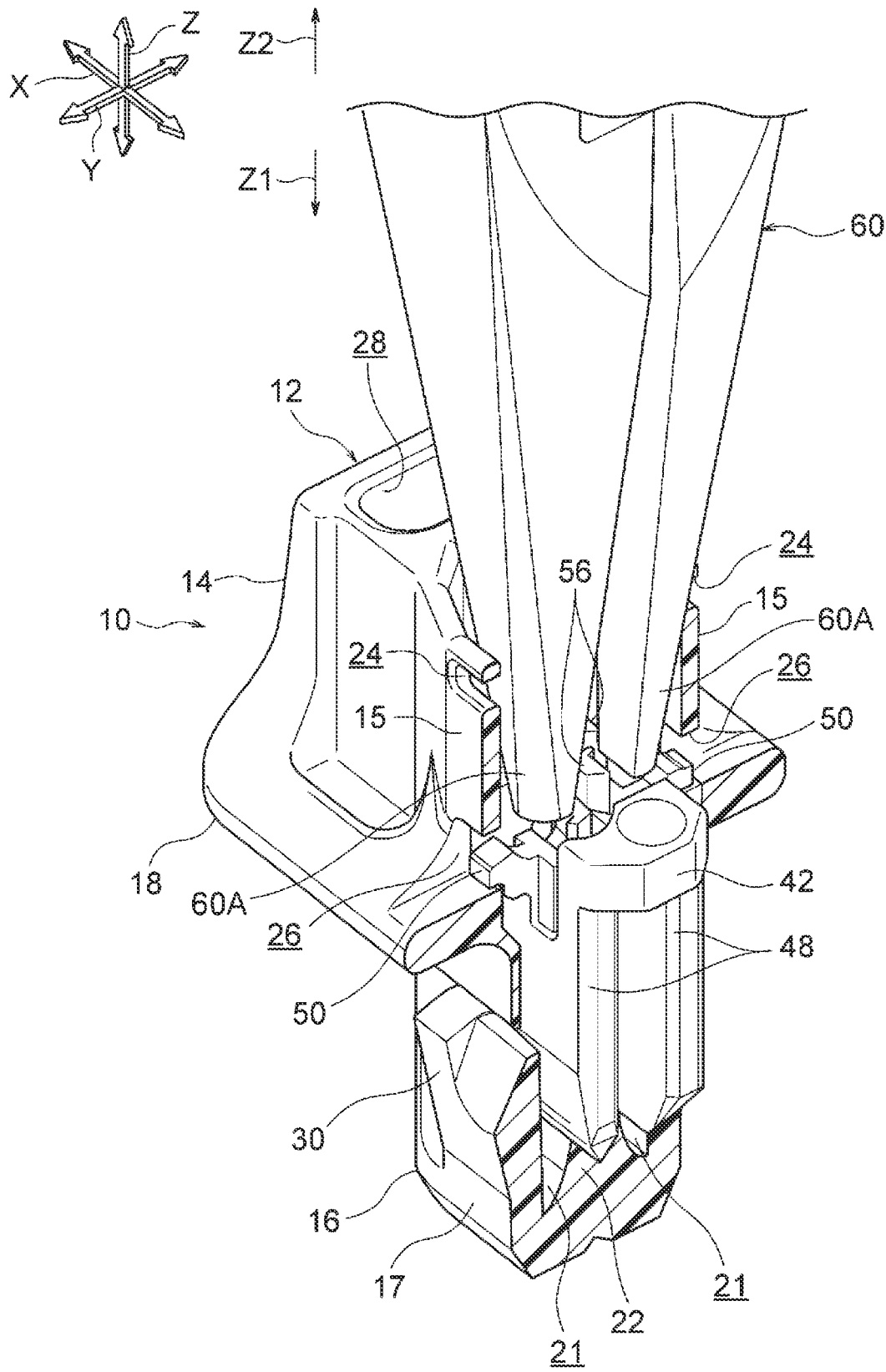
FIG. 11 is a perspective view corresponding to FIG. 3, showing a state where the pinching portions are pinched by the needle-nose pliers.
Figure 12:
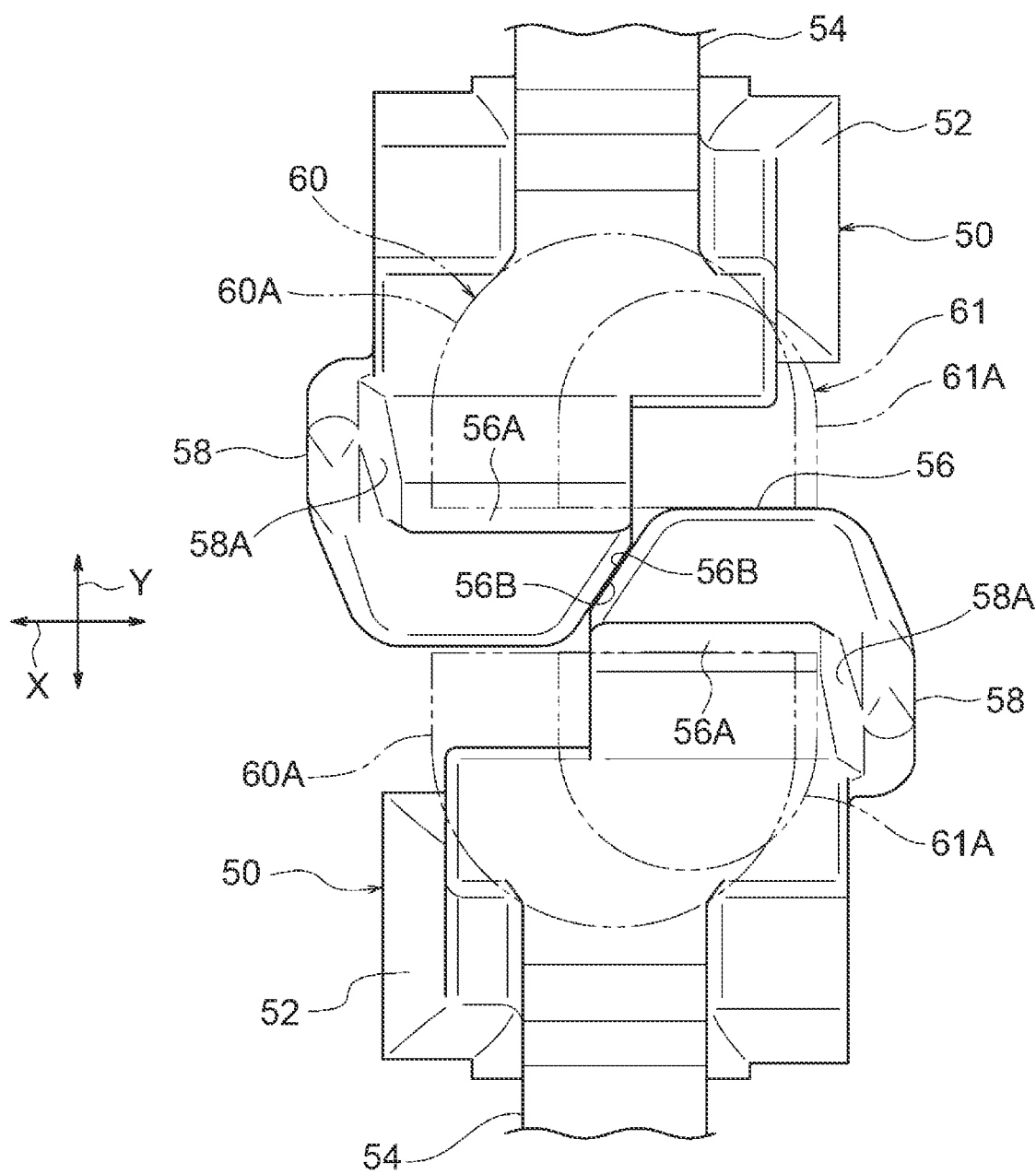
FIG. 12 is a plan view showing a partial configuration of the lock pin, and is an enlarged view showing a state where the locking portions are positioned close to each other and the pinching portions are positioned close to each other.

In the present embodiment, as shown in FIGS. 9A to 12, when the lock pin 40 located at the main locking position is removed from the clip body 12, the pinching portions 56 are pinched by tip portions 60A of needle-nose pliers 60 from outside in the opposing direction Y. As a result, the pinching portions 56 are brought to be close to each other together with the locking portions 50. At this time, as shown in FIG. 12, the tip portions 60A of the needle-nose pliers 60 come into contact with end surfaces 56A of the pinching portions 56 in the opposing direction Y. The needle-nose pliers 60 can be regarded as a "tool" in the present disclosure. The needle-nose pliers 60 are of a general size. In FIG. 12, reference signs 61A denote tip portions of the special needle-nose pliers 61 different from the needle-nose pliers 60 described above. The tip portions 61A of the needle-nose pliers 61 are each thinner than the tip portions 60A of the needle-nose pliers 60.

As shown in FIGS. 10 to 12, when the pinching portions 56 are pinched by the tip portions 60A of the needle-nose pliers 60 and are positioned close to each other, the pinching portions 56 are aligned in the offset direction X, that is, the pinching portions 56 overlap each other as viewed in the offset direction X. In this state, as shown in FIG. 12, the end surfaces 56B on the inner sides of the pinching portions 56 in the offset direction X are configured to come into contact with each other. Further, in this state, the pin locking lugs 54 of the locking portions 50 come out of the body locking holes 86 of the clip body 12, and the locking of the lock pin 40 with respect to the clip body 12 is released. Specifically, in this state, the pin locking lugs 54 of the locking portions 50 are arranged inward of the wall portions 15 of the body head portion 14 in the opposing direction Y.

Further, in a state where the pinching portions 56 are pinched by the tip portions 60A of the needle-nose pliers 60 and are positioned close to each other as described above, the pinching portions 56 are each held by the tip portions 60A of the needle-nose pliers 60. That is, in this state, the tip portions 60A of the needle-nose pliers 60 are pressed against each of the pinching portions 56 from both sides in the opposing direction Y.

Further, in the present embodiment, a wall portion 58 integrally extending outward in the opposing direction Y is provided at the end portion of each pinching portion 56 on the outer side in the offset direction X. The dimension of distance between one wall portion 58 and the other wall portion 58 in the offset direction X is set to be slightly larger than the width dimension of the tip portions 60A of the general needle-nose pliers 60. As shown in FIG. 12, an end surface 58A of each wall portion 58 on the inner side in the offset direction X inclines or curves (inclines here) further outward in the offset direction X as it extends outward in the opposing direction Y. In addition, as shown in FIG. 12, each wall portion 58 bulges further outward in the offset direction X than each locking portion body 52. The end portion of each wall portion 58 on the insertion direction Z1 side is integrally connected to each locking portion body 52.

Operations and Effects

Next, operations and effects of the present embodiment will be described.

In the vehicle curtain airbag device 80 according to the present embodiment, the curtain airbag 82 stored in the roof side portion 88 of the vehicle V receives gas supplied therein from the inflator to inflate and expand toward the lower side of the vehicle. The fixing holes 96 are provided in the body panel 94 provided in the roof side portion 88, and the clip body 12 of the clip 10 is inserted in each fixing hole 96. The curtain airbag 82 is locked to the body panel 94 by the clip bodies 12. The lock pin hole 20 is provided in the clip body 12 of each clip 10, and removal of the clip body 12 from the fixing hole 96 is restricted by the lock pin 40 inserted and disposed in the lock pin hole 20.

The lock pin 40 has the locking portions 50 and the pinching portions 56. The locking portions 50 are arranged so as to face each other in the opposing direction Y that is orthogonal to the insertion direction Z1 with respect to the lock pin hole 20. The locking portions 50 each engage with the clip body 12 to lock the lock pin 40 to the clip body 12. The locking portions 50 elastically deform toward the side that brings the locking portions 50 close to each other to release the engagement.

The pinching portions 56 extend from the locking portions 50 toward the opening side of the lock pin hole 20 (i.e., removal direction Z2 side) and toward the side that brings the locking portions 50 close to each other (i.e., inward in the opposing direction Y). Further, the pinching portions 56 are arranged so as to be offset from each other in the offset direction X that is orthogonal to the insertion direction Z1 and the opposing direction Y. When the pinching portions 56 are pinched by the needle-nose pliers 60 from the outside in the opposing direction Y, the locking portions 50 become close to each other together with the pinching portions 56. As a result, the engagement of the locking portions 50 with the clip body 12 is released, which enables the lock pin 40 to be removed from the clip body 12.

The pinching portions 56 are arranged so as to be offset from each other in the offset direction X. Therefore, even with the configuration in which the pinching portions 56 extend from the locking portions 50 toward the removal direction Z2 side and inward in the opposing direction Y, a displacement stroke of the pinching portions 56 when pinched by the needle-nose pliers 60 can be secured. In other words, as shown in FIGS. 1, 3 to 5, 7, 9A to 9C, the pinching portions 56 in a state where they are not pinched by the needle-nose pliers 60 can be arranged close to each other toward the inside in the opposing direction Y. As a result, gaps S shown in FIGS. 7 and 9A can be set to be wide. The gaps S are spaces between the pinching portions 56 and the inner peripheral surface of the lock pin hole 20 (here, the inner surfaces of the wall portions 15 in the opposing direction Y), that is, spaces for inserting the tip portions 60A of the needle-nose pliers 60 when pinching the pinching portions 56 with the tip portions 60A of the needle-nose pliers 60. This makes it possible to pinch the pinching portions 56 with the general needle-nose pliers 60. Note that, in FIG. 9B and FIG. 9C, the reference signs of the gaps S are omitted.

The above effects will be supplementarily described using a clip 100 as a comparative example shown in FIGS. 15 to 19. In FIGS. 15 to 19, the same reference signs are given to the same configurations as in the present embodiment. The clip 100 has the same configuration as the related-art clip described in the background art section. In the clip 100, a pair of pinching portions 410 provided to a lock pin 400 is different from the pair of pinching portions 56 according to the present embodiment, but other configurations are the same as those of the clip 10 according to the present embodiment.

Figure 18:
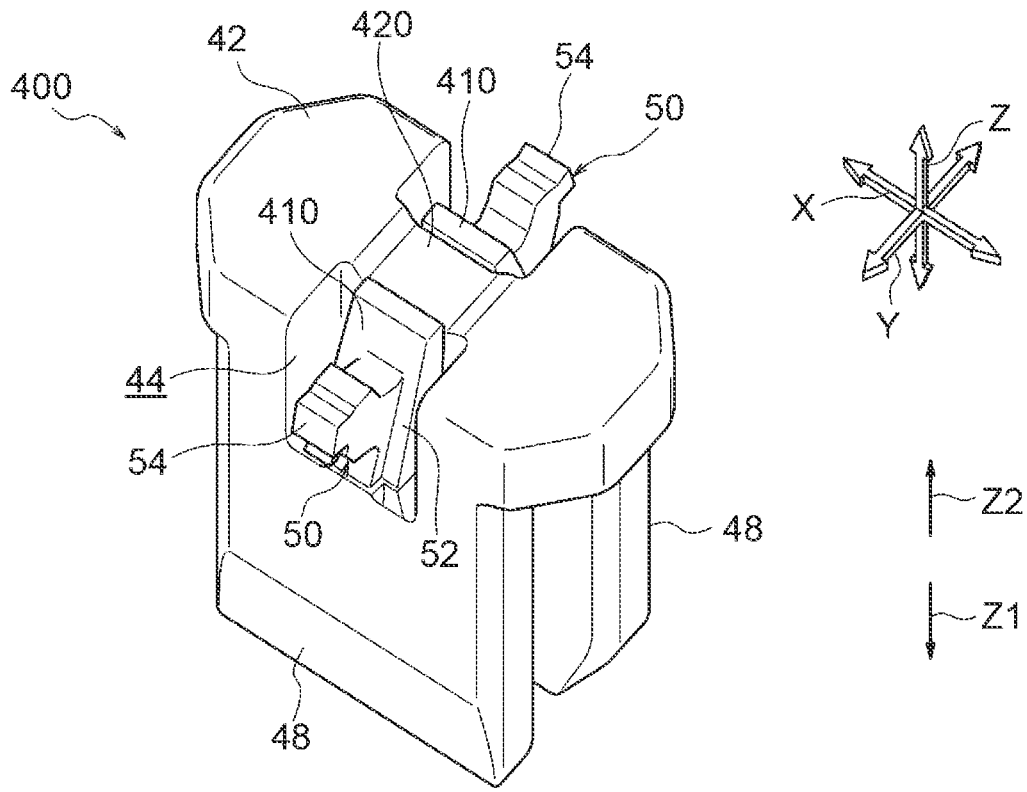
FIG. 18 is a perspective view corresponding to FIG. 17, showing a state where the locking portions are positioned close to each other and the pinching portions are positioned close to each other.

The pinching portions 410 are arranged so as to face each other in the opposing direction Y and so as not to be offset from each other in the offset direction X. Further, in the lock pin 400 of the comparative example, a bridge portion 420 is provided between the pinching portions 410. The bridge portion 420 has a bridge shape and integrally extends between portions at the opposite ends of the pin head portion 42 in the offset direction X. The bridge portion 420 is sandwiched between the pinching portions 410 in the opposing direction Y as shown in FIG. 18 when the pinching portions 410 are pinched by a tool such as needle-nose pliers. In FIG. 18, the above tool is not shown. That is, the pinching portions 410 pinched by the tool receive a reaction force from the bridge portion 420. This makes it easier to hold the lock pin 400 with the tool when the lock pin 400 is removed from the lock pin hole 20 by pinching the pinching portions 410 with the tool.

Figure 19:
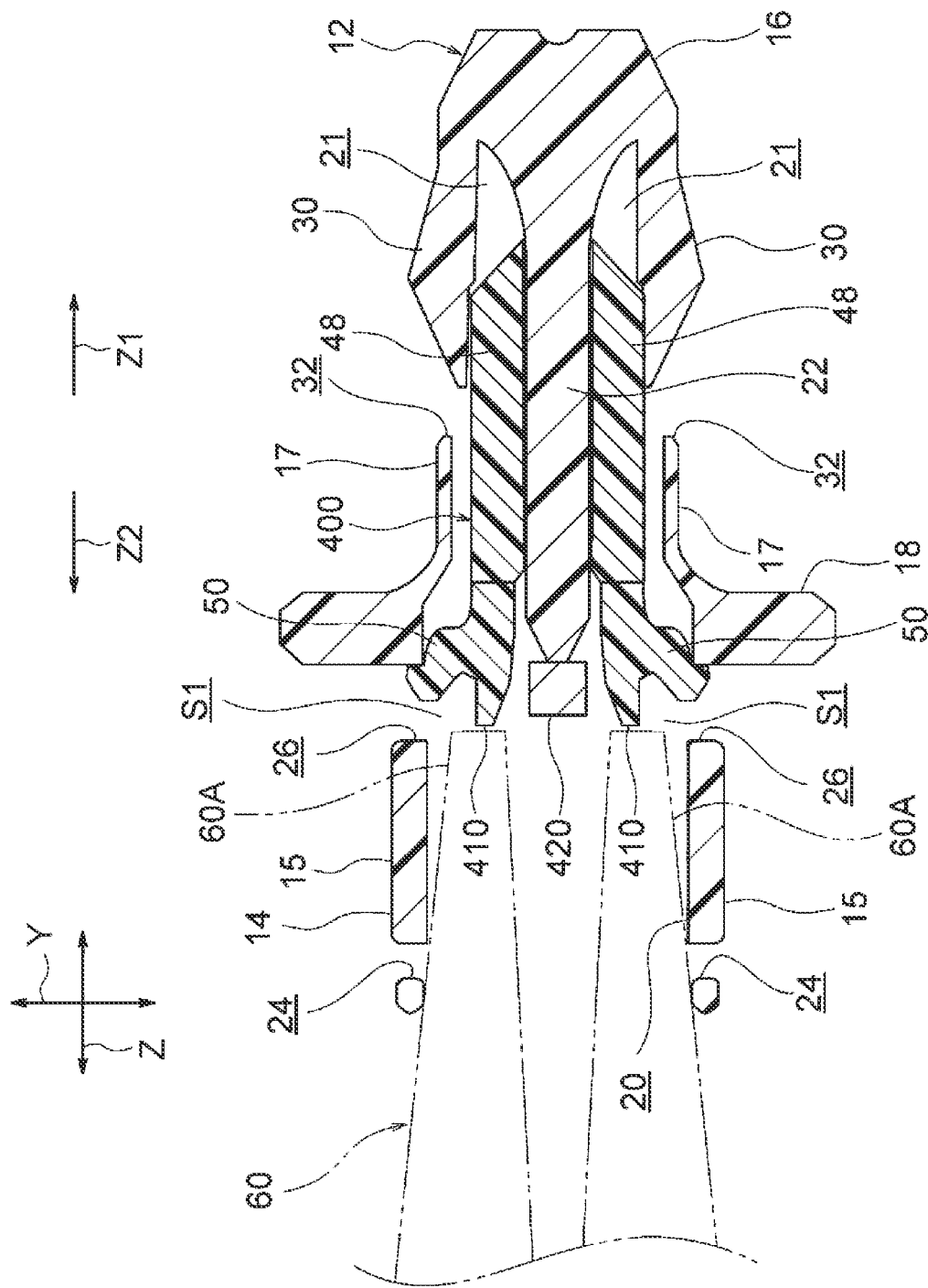
FIG. 19 is a sectional view showing a section cut along line E-E of FIGS. 15 and 16.

In the clip 100 having the above configuration, as described in the section of "Summary", the size of the clip 100 is limited because the space for disposing the clip 100 in the vehicle is limited. Further, the pinching portions 410 are arranged so as to face each other in the opposing direction Y, and the bridge portion 420 is disposed between the pinching portions 410. Therefore, it is difficult to arrange the pinching portions 410 in a state where they are not pinched by the tool close to each other toward the inside in the opposing direction Y. As a result, gaps S1 (see FIGS. 15 and 19) between the pinching portions 410 and the inner peripheral surface of the lock pin hole 20 cannot be set to be wide. Therefore, as shown in FIG. 19, the tip portions 60A of the general needle-nose pliers 60 cannot be inserted into the gaps S1, so the pinching portions 410 cannot be pinched with the general needle-nose pliers 60. As a result, special needle-nose pliers 61 or the like having thinner tip portions are required, which causes issues such as low versatility.

In this respect, in the present embodiment, the pinching portions 56 can be pinched with the general needle-nose pliers 60, so the versatility is increased. As a result, the manufacturing control at the work site of assembling the curtain airbag 82 to the vehicle V becomes easy. Further, the clip 10 according to the present embodiment has basically the same configuration as the clip 100 of the related art. Therefore, it is not necessary to expand a space in which the clip 10 is disposed in the vehicle V, which can suppress increase in manufacturing cost and weight. Further, compatibility with the clip 100 of the related art can be ensured. Thus, for example, at the timing of changeover from the old lock pins 40 to the new lock pins 400, the old and new lock pins 40 and 400 can be produced in a mixed manner, and the restriction on changeover from the old lock pins 40 to the new lock pins 400 can be significantly reduced.

Further, in the clip 10 according to the present embodiment, when the pinching portions 56 of the lock pin 40 are pinched by the needle-nose pliers 60 and are positioned close to each other, each pinching portion 56 is held by the needle-nose pliers 60. This makes it easier for the needle-nose pliers 60 to firmly hold the lock pin 40 when the lock pin 40 is removed from the lock pin hole 20 by pinching the pinching portions 56 with the needle-nose pliers 60.

Further, in the clip 10, the wall portions 58 integrally extending outward in the opposing direction Y are provided at end portions of the pinching portions 56 on the outer sides in the offset direction X. Therefore, when the pinching portions 56 are pinched by the needle-nose pliers 60, the wall portions 58 interfere with the tip portions 60A of the needle-nose pliers 60 from the outside in the offset direction X. Thereby, as shown in FIG. 12, the position of the needle-nose pliers 60 in the offset direction X can be limited. As a result, it is possible to suppress a situation in which the pinching portions 56 are pinched with one of the pinching portions 56 being intensely pinched.

In the wall portions 58, the end surfaces 58A on the inner side in the offset direction X incline further outward in the offset direction X as they extend outward in the opposing direction Y. With the end surfaces 58A, the tip portions 60A of the needle-nose pliers 60 can be guided toward the center in the offset direction X with respect to the pinching portions 56, that is, the tip portions 60A of the needle-nose pliers 60 can be centered. As a result, it becomes easy to properly pinch the pinching portions 56 with the needle-nose pliers 60.

Further, in the present embodiment, the wall portions 58 are integrally connected to the locking portion bodies 52 of the locking portions 50. The pinching portions 56 extend from the locking portion bodies 52 toward the removal direction Z2 side and inward in the opposing direction Y. The root portions of the pinching portions 56 can be reinforced with the wall portions 58 integrally connected to the locking portion bodies 52 as described above.

Further, in the present embodiment, in the pinching portions 56, the end surfaces 56B on the inner sides in the offset direction X incline in the same direction with respect to the offset direction X when viewed in the insertion direction Z1. Thus, in the pinching portions 56, the dimension of the end surfaces 56A that come into contact with the tip portions 60A of the needle-nose pliers 60 in the offset direction X can be increased. As a result, even when the pinching portions are pinched with the special needle-nose pliers 61 with thinner tip portions, for example, the tip portions 61A of the needle-nose pliers 61 can be easily engaged with the pinching portions 56.

Supplementary Description of Embodiment

In the above embodiment, the end surfaces 56B of the pinching portions 56 on the inner sides in the offset direction X incline in the same direction with respect to the offset direction X when viewed in the insertion direction Z1, but the present disclosure is not limited to this. For example, the end surfaces 56B of the pinching portions 56 may be orthogonal to the offset direction X.

Further, in the above embodiment, the wall portions 58 integrally extending from the pinching portions 56 are integrally connected to the locking portions 50, but the present disclosure is not limited to this. The wall portions 58 and the locking portions 50 may be divided.

Further, in the above embodiment, the end surfaces 58A of the wall portions 58 on the inner sides in the offset direction X incline further outward in the offset direction X as they extend outward in the opposing direction Y, but the present disclosure is not limited to this. The end surfaces 58A of the wall portions 58 may be orthogonal to the offset direction X.

Further, in the above embodiment, the wall portions 58 integrally extend from the pinching portions 56, but the present disclosure is not limited to this. The wall portions 58 may be omitted.

Further, in the above embodiment, when the pinching portions 56 are pinched by the needle-nose pliers 60 so as to be positioned close to each other, the pinching portion 56 are each held by the needle-nose pliers 60, but the present disclosure is not limited to this. Only one of the pinching portions 56 may be held by the tool such as needle-nose pliers 60.

Further, in the above embodiment, a case where the present disclosure is applied to the clip 10 for fixing the curtain airbag 82 to the body panel 94 has been described, but the present disclosure is not limited thereto. The clip according to the present disclosure can be used as a fixture for fixing vehicle parts to a vehicle body panel or the like.

In addition, the present disclosure can be implemented with various modifications without departing from the scope of the disclosure. Further, it goes without saying that the scope of rights of the present disclosure is not limited to the above-described embodiment.

What is claimed is:

1. A clip comprising:
a clip body that has a lock pin hole and that is inserted in a fixing hole provided in an object to be fixed; and
a lock pin that is inserted and arranged in the lock pin hole to restrict removal of the clip body from the fixing hole, wherein the lock pin includes
a pair of locking portions, the locking portions being arranged so as to face each other in an opposing direction that is orthogonal to an insertion direction to the lock pin hole, the locking portions each engaging with the clip body to lock the lock pin to the clip body, and the locking portions elastically deforming toward a side that brings the locking portions close to each other to release engagement, and
a pair of pinching portions, the pinching portions extending toward an opening side of the lock pin hole and toward the side that brings the locking portions close to each other, the pinching portions being arranged so as to be offset from each other in an offset direction that is orthogonal to the insertion direction and the opposing direction, and the pinching portions being pinched by a tool from outside in the opposing direction so as to become close to each other together with the locking portions,
wherein end portions of the pinching portions on outer sides in the offset direction are each provided with a wall portion integrally extending outward in the opposing direction.

2. The clip according to claim 1, wherein when the pinching portions are pinched by the tool and are positioned close to each other, the pinching portions are each held by the tool.

3. The clip according to claim 1, wherein an end surface of the wall portion on an inner side in the offset direction inclines or curves further outward in the offset direction as extending outward in the opposing direction.

4. The clip according to claim 1, wherein the wall portion is integrally connected to each of the locking portions.

5. The clip according to claim 1, wherein end surfaces of the pinching portions on inner sides in the offset direction incline in the same direction with respect to the offset direction when viewed in the insertion direction.

6. A vehicle curtain airbag device, comprising:
a curtain airbag that is stored in an upper part of a vehicle cabin side portion and that is inflated and expanded toward a lower side of a vehicle when gas is supplied in the curtain airbag; and
the clip according to claim 1, in which the clip body is inserted in the fixing hole provided in a body panel that serves as an object to be fixed and that is provided in the upper part of the vehicle cabin side portion, the curtain airbag being locked to the body panel by the clip body.

7. A vehicle curtain airbag device, comprising:
a curtain airbag that is stored in an upper part of a vehicle cabin side portion and that is inflated and expanded toward a lower side of a vehicle when gas is supplied in the curtain airbag; and
the clip according to claim 2, in which the clip body is inserted in the fixing hole provided in a body panel that serves as an object to be fixed and that is provided in the upper part of the vehicle cabin side portion, the curtain airbag being locked to the body panel by the clip body.

8. A vehicle curtain airbag device, comprising:
a curtain airbag that is stored in an upper part of a vehicle cabin side portion and that is inflated and expanded toward a lower side of a vehicle when gas is supplied in the curtain airbag; and
the clip according to claim 3, in which the clip body is inserted in the fixing hole provided in a body panel that serves as an object to be fixed and that is provided in the upper part of the vehicle cabin side portion, the curtain airbag being locked to the body panel by the clip body.

9. A vehicle curtain airbag device, comprising:
a curtain airbag that is stored in an upper part of a vehicle cabin side portion and that is inflated and expanded toward a lower side of a vehicle when gas is supplied in the curtain airbag; and
the clip according to claim 4, in which the clip body is inserted in the fixing hole provided in a body panel that serves as an object to be fixed and that is provided in the upper part of the vehicle cabin side portion, the curtain airbag being locked to the body panel by the clip body.

10. A vehicle curtain airbag device, comprising:

a curtain airbag that is stored in an upper part of a vehicle cabin side portion and that is inflated and expanded toward a lower side of a vehicle when gas is supplied in the curtain airbag; and the clip according to claim 5, in which the clip body is inserted in the fixing hole provided in a body panel that serves as an object to be fixed and that is provided in the upper part of the vehicle cabin side portion, the curtain airbag being locked to the body panel by the clip body.

11. The clip according to claim 1, wherein, in a state where the pinching portions are pinched by the tip portions of the tool and are positioned close to each other, end surfaces on inner sides of the pinching portions in the offset direction are configured to come into contact with each other.

12. The clip according to claim 11, wherein the tool is a needle-nose pliers.

13. The clip according to claim 1, wherein a distance between the wall portions in the offset direction is larger than a width of the tip portions of the tool.

* * * * *